United States Patent
Lawless et al.

(10) Patent No.: US 11,633,909 B2
(45) Date of Patent: *Apr. 25, 2023

(54) METHODS, SYSTEMS, AND DEVICES FOR THREE-DIMENSIONAL OBJECT GENERATION AND PHYSICAL MASK CURING

(71) Applicant: CALT DYNAMICS Limited, County Wicklow (IE)

(72) Inventors: Ross Lawless, Newtownmountkennedy (IE); Irene Villafane, Newtownmountkennedy (IE); Warren Katz, Boston, MA (US)

(73) Assignee: CALT DYNAMICS LIMITED, Wicklow (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/260,347

(22) PCT Filed: Jul. 26, 2019

(86) PCT No.: PCT/US2019/043764
§ 371 (c)(1),
(2) Date: Jan. 14, 2021

(87) PCT Pub. No.: WO2020/028192
PCT Pub. Date: Feb. 6, 2020

(65) Prior Publication Data
US 2021/0291436 A1     Sep. 23, 2021

Related U.S. Application Data

(60) Provisional application No. 62/743,615, filed on Oct. 10, 2018, provisional application No. 62/711,516, filed on Jul. 28, 2018.

(51) Int. Cl.
*B29C 64/129* (2017.01)
*B33Y 10/00* (2015.01)
(Continued)

(52) U.S. Cl.
CPC .......... *B29C 64/129* (2017.08); *B29C 64/255* (2017.08); *B29C 64/286* (2017.08);
(Continued)

(58) Field of Classification Search
None
See application file for complete search history.

(56) References Cited

U.S. PATENT DOCUMENTS 4,074,287 A   2/1978   Iwata et al.
4,086,582 A   4/1978   Kiyohara et al.
(Continued)

FOREIGN PATENT DOCUMENTS

JP   07195542 A  *  8/1995   ........... B29C 64/141
WO   2017079774 A2    5/2017

OTHER PUBLICATIONS

International Search Report and Written Opinion for International Application No. PCT/US2020/26288 dated Aug. 17, 2020; 21 pgs.
(Continued)

*Primary Examiner* — Matthew J Daniels
*Assistant Examiner* — Gregory C. Grosso
(74) *Attorney, Agent, or Firm* — Cantor Colburn LLP

(57) ABSTRACT

Systems, apparatus, and methods are described for additive manufacturing or three dimensional (3D) printing of objects using a set of physical masks. An additive manufacturing device can include one or more light sources, a vessel containing a volume of print material and a transparent base through which light can enter the vessel to cure a portion of the volume of print material, and a set of masks defining a series of patterns associated with layers of a 3D object that
(Continued)

are each positionable between the light source and the transparent base to control a pattern of the light that is received through the transparent base and therefore the pattern of the cured portion of print material.

17 Claims, 36 Drawing Sheets

(51) Int. Cl.
    *B33Y 30/00*     (2015.01)
    *B33Y 50/02*     (2015.01)
    *B29C 64/255*     (2017.01)
    *B29C 64/393*     (2017.01)
    *B29C 64/286*     (2017.01)
    *B29C 64/35*     (2017.01)
    *B33Y 40/20*     (2020.01)

(52) U.S. Cl.
    CPC ............ *B29C 64/35* (2017.08); *B29C 64/393* (2017.08); *B33Y 10/00* (2014.12); *B33Y 30/00* (2014.12); *B33Y 40/20* (2020.01); *B33Y 50/02* (2014.12)

(56) References Cited

U.S. PATENT DOCUMENTS

| | | | |
|---|---|---|---|
| 4,961,154 A * | 10/1990 | Pomerantz | B33Y 40/00 264/401 |
| 5,009,585 A * | 4/1991 | Hirano | B29C 64/135 118/500 |
| 5,034,263 A | 7/1991 | Maier et al. | |
| 5,135,379 A | 8/1992 | Fudim | |
| 6,040,094 A * | 3/2000 | Otsuka | G03F 7/12 430/4 |
| 6,547,552 B1 | 4/2003 | Fudim | |
| 10,675,856 B2 | 6/2020 | Frantzdale | |
| 10,710,303 B2 | 7/2020 | Broady et al. | |
| 2015/0137426 A1 | 5/2015 | Van Esbroeck et al. | |
| 2015/0145171 A1 | 5/2015 | Walker et al. | |
| 2015/0251351 A1 * | 9/2015 | Feygin | B33Y 30/00 156/267 |
| 2016/0059486 A1 | 3/2016 | Desimone et al. | |
| 2016/0136902 A1 | 5/2016 | Stadlmann | |
| 2017/0173872 A1 | 6/2017 | Mccall et al. | |
| 2017/0281828 A1 | 10/2017 | Zhang et al. | |
| 2017/0297102 A1 | 10/2017 | Chin et al. | |
| 2017/0355132 A1 | 12/2017 | Moore | |
| 2019/0351609 A1 * | 11/2019 | Thau | B29C 64/124 |
| 2019/0366635 A1 * | 12/2019 | Holt | B29C 64/264 |
| 2019/0369566 A1 | 12/2019 | Lobovsky et al. | |
| 2020/0250322 A1 * | 8/2020 | Sayers | G06F 21/608 |
| 2020/0276752 A1 | 9/2020 | Yonezaki | |
| 2021/0146620 A1 | 5/2021 | Rakkolainen et al. | |

OTHER PUBLICATIONS

International Search Report and Written Opinion for International Application No. PCT/US2019/043764 dated Oct. 9, 2019; 18 pgs.
Anonymous. "Introducing the Form 3 and Form 3L, Powered by Low Force Stereolithography." Formlabs, Apr. 2, 2019, formlabs.com/blog/introducing-form-3-form-3l-low-force-stereolithography.
Ink—Wikipedia, https://en.wikipedia.org/wiki/Ink, accessed Jun. 17, 2022.
Photographic Film, Wikipedia—https://en.wikipedia.org/wiki/Photographic_film, accessed Jun. 17, 2022.

* cited by examiner

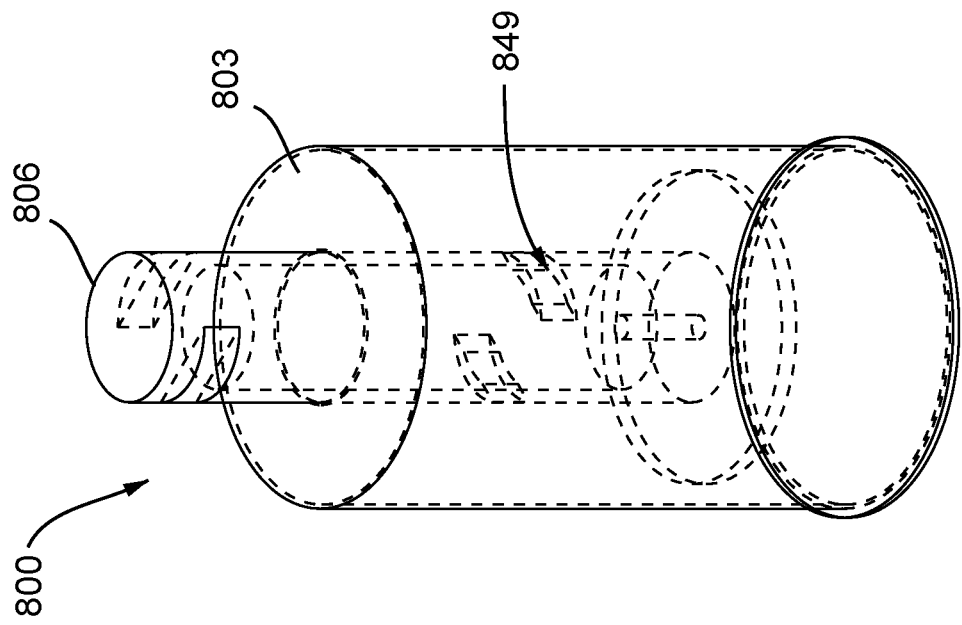
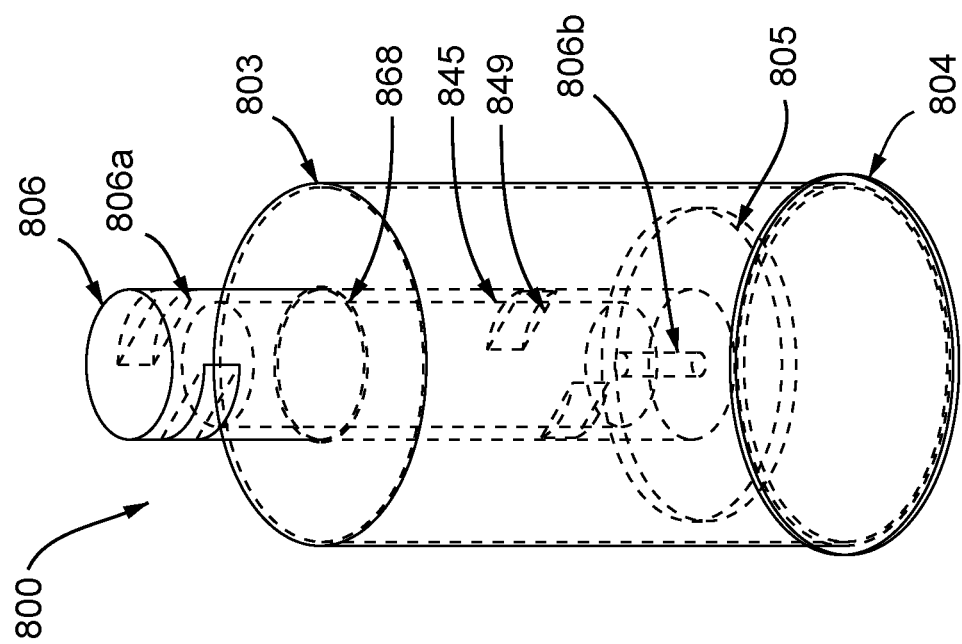

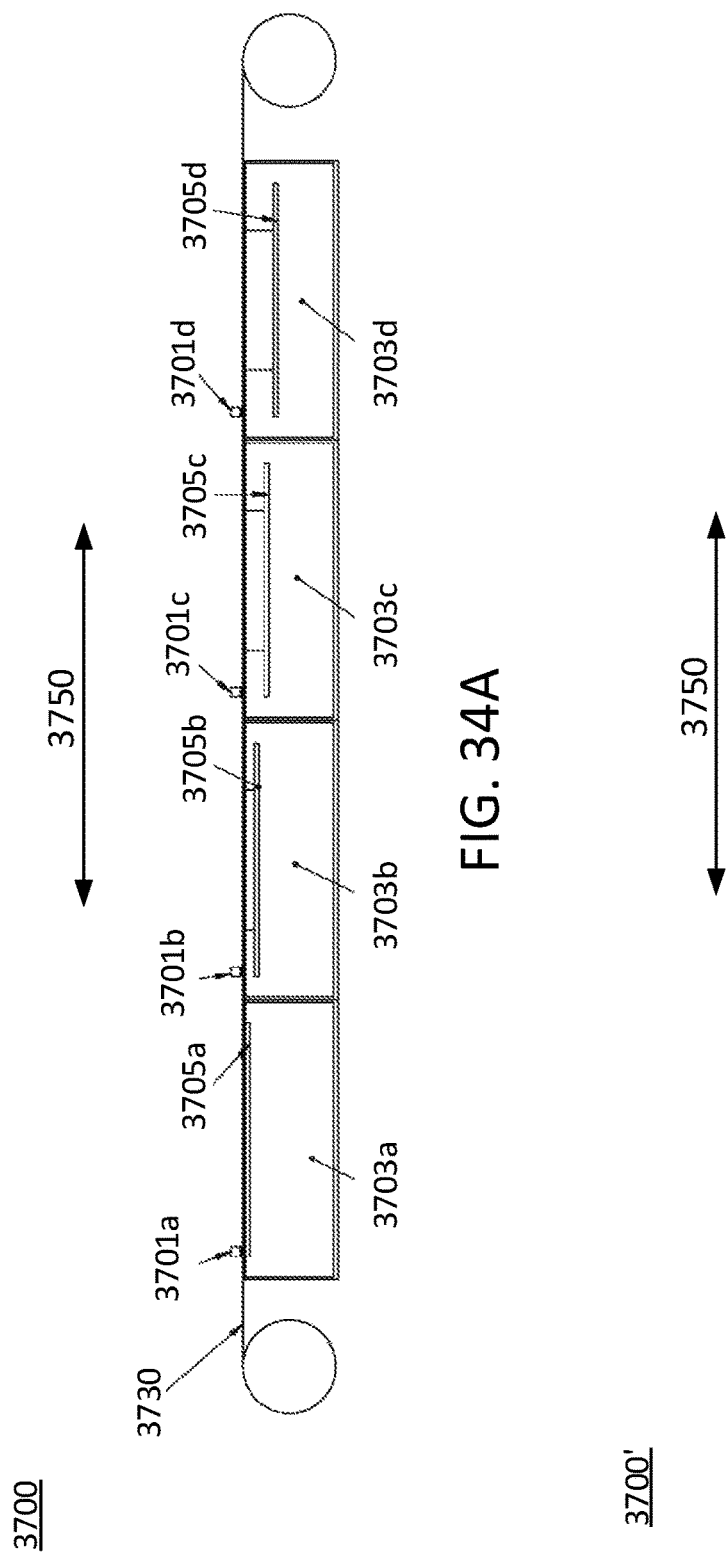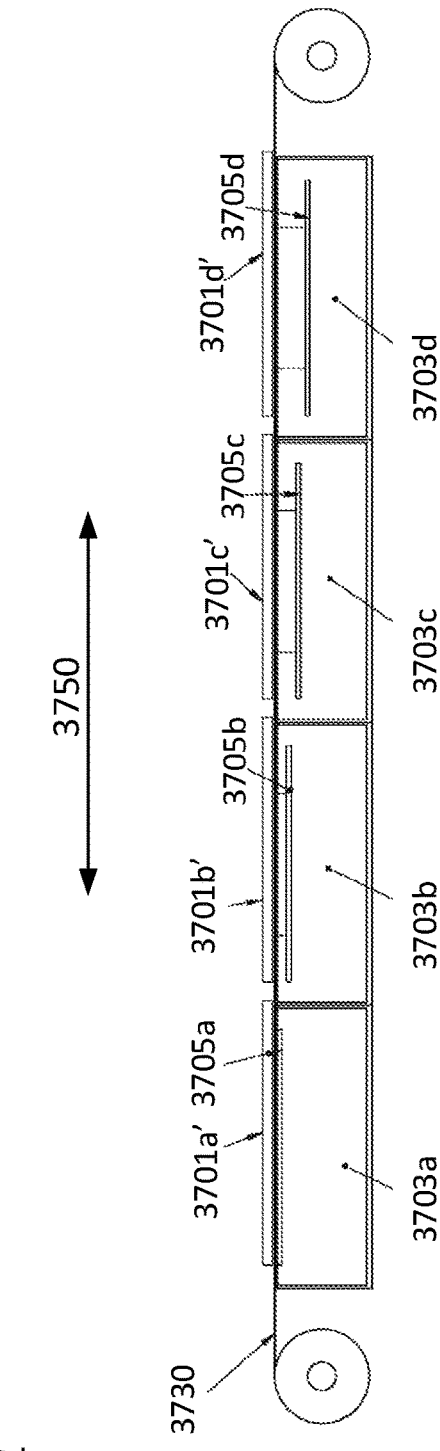

METHODS, SYSTEMS, AND DEVICES FOR THREE-DIMENSIONAL OBJECT GENERATION AND PHYSICAL MASK CURING

CROSS-REFERENCE TO RELATED APPLICATIONS

This application is a National Stage Application of Patent Application PCT/US2019/043764 filed on Jul. 26, 2019, which claims the benefit of and priority to U.S. Provisional Patent Application No. 62/711,516 filed Jul. 28, 2018, and U.S. Provisional Patent Application No. 62/743,615 filed Oct. 10, 2018, the contents of which are incorporated herein by reference in their entirety.

TECHNICAL FIELD

The present disclosure relates generally to methods, systems, and devices for additive manufacturing or printing of three-dimensional (3D) objects, and more specifically, to 3D printing using physical media or masks including information regarding a 3D object along with a vessel containing a printing substance (e.g., a photopolymer).

BACKGROUND

Printing of 3D objects typically involves the use of a printer that applies thin layers of material in succession. For example, a 3D printer can include a container for holding a liquid polymer that can be cured to produce a 3D object. The printer can include a light source and a controller that selectively controls the light source to expose the liquid polymer to light to print successive layers of the 3D object. Existing systems, however, require light sources that are dynamically controllable by a compute device to form specific layers of a 3D object. Moreover, existing systems require users to adapt digital files or other software to specify the print settings required for printing each 3D object. As such, existing systems may be costly, and require users having specific programming knowledge to operate and adapt such systems. It is therefore desirable to have an additive manufacturing device capable of being used without dynamically controllable light sources or specifically tailored digital files and other programming to manufacture a 3D object.

SUMMARY

Systems, devices, and methods are described for additive manufacturing or 3D manufacturing of physical objects. In some embodiments, an additive manufacturing device can include one or more light sources, a vessel containing a volume of print material and a transparent base through which light can enter the vessel to cure a portion of the volume of print material, and a set of masks defining a series of patterns associated with layers of a 3D object that are each positionable between the light source and the transparent base to control a pattern of the light that is received through the transparent base and therefore the pattern of the cured portion of print material.

In some embodiments, an apparatus includes a light source configured to emit light; a vessel including: a chamber configured to contain a volume of print material; and a transparent base through which light can be received into the chamber to cure a portion of the volume of print material; and a set of masks defining a series of patterns associated with layers of a three-dimensional (3D) object, the set of masks positionable between the light source and the transparent base to control a pattern of the light that is received through the transparent base and into the chamber.

In some embodiments, the light emitted by the light source can be ultraviolet (UV) light, and the set of masks includes a substrate with etched areas that are transmissive to UV light and nonetched areas that block UV light. Alternatively or additionally, the set of masks can include a substrate printed with ink that defines the series of patterns and is configured to block transmission of a portion of the UV light. Alternatively or additionally, the set of masks can include a substrate including cutouts that define the series of patterns. The substrate can be any suitable type of material, including, for example, a paper, a polymer, a multi-layer material, etc.

In some embodiments, an apparatus includes a memory; a light source configured to emit light; and a processor operatively coupled to the memory and the light source, the processor configured to: receive, via an input device, an input from a user requesting a print of a three dimensional (3D) object; in response to receiving the input, obtain information associated with a mask carrier storing a set of masks for printing the 3D object; control the mask carrier to move individual masks from the set of masks into position between the light source and a transparent base of a vessel containing a volume of print material according to a sequence based on the information associated with the mask carrier; and control the light source to emit light toward the individual masks to produce a pattern of light that can be received through the transparent base into the vessel to cure a portion of the volume of print material, such that layers of the 3D object can be printed onto a print bed disposed within the vessel.

In some embodiments, the processor can be further configured to determine whether the mask carrier and the vessel have been installed prior to controlling he mask carrier and the light source to print the layers of the 3D object. In some embodiments, the processor can be further configured to present an error signal when the mask carrier or the vessel have not been installed.

In some embodiments, the processor can be operatively coupled to a near field communication (NFC) tag reader that can read information associated with the mask carrier from a NFC tag located on the mask carrier. In some embodiments, this information can include a number of masks in the set of masks, a height of each layer of the 3D object, a light exposure time required to form each layer of the 3D object, a distance between adjacent masks from the set of masks, or a size of each of the set of masks.

In some embodiments, a method includes receiving, via an input device of a printing device, an input from a user requesting a print of a three dimensional (3D) object; in response to receiving the input, obtaining information associated with a mask carrier storing a set of masks for printing layers of a 3D object, each of the set of masks including a pattern associated with a layer of the 3D object; for each of the set of masks and according to a sequence based on the information associated with the mask carrier: positioning that mask between a transparent base of a vessel containing a volume of print material and a light source of the printing device; positioning a print bed in the vessel such that the print bed or a layer of the 3D object previously printed on the print bed is separated by one layer height from the transparent base; emitting, via the light source, light toward that mask for a predetermined period of time such that an image associated with the pattern of that mask is transmitted through the transparent base to cure a portion of the volume of print material and print a layer of the 3D object; and moving the print bed to separate the layer of the 3D object from the transparent base.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 14A-B are perspective views of a vessel of an additive manufacturing device in different configurations and with outer portions shown transparently for illustrative purposes, according to embodiments disclosed herein.

FIG. 34A-34B are cross-sectional views of additive manufacturing devices for batch production, according to embodiments disclosed herein.

DETAILED DESCRIPTION

Figure 1:
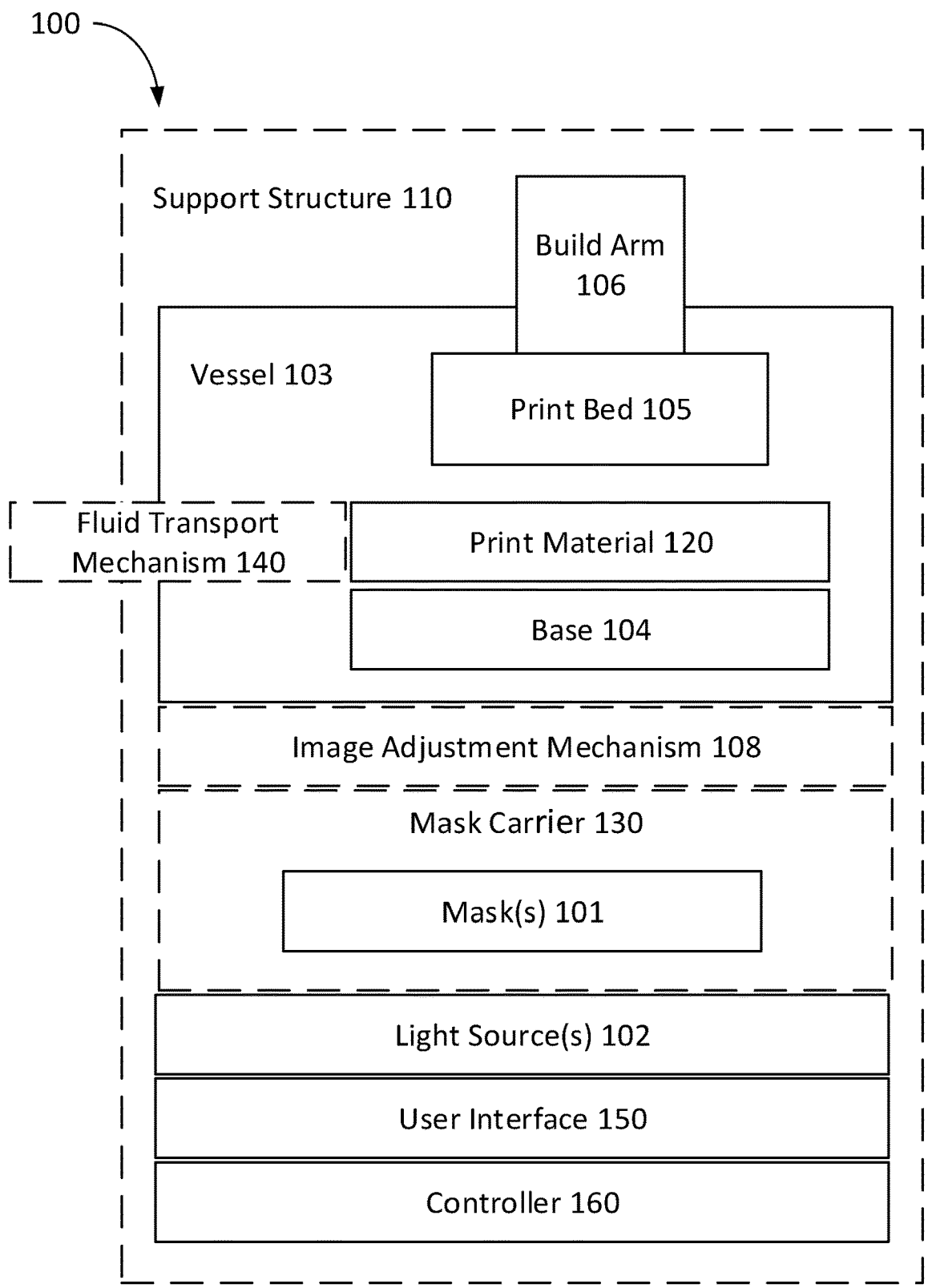
FIG. 1 is a schematic illustration of an additive manufacturing device, according to embodiments disclosed herein.

Systems, devices, and methods are described herein for additive manufacturing or printing of 3D objects. In some embodiments, systems, devices, and methods relate to additive manufacturing or 3D printing using a vessel, which contains one or more components for printing a 3D object, a physical mask or media, and one or more light sources. In some embodiments, the vessel can contain a volume of a print material (e.g., a photopolymer), a print bed, a build arm, and a cleaning agent (e.g., a carbonated or non-carbonated cleaning fluid, such as, for example, alcohol), each contained in one or more chambers of the vessel. In some embodiments, the light source can be a non-dynamic light source such as a light emitting diode.

Additive manufacturing or 3D manufacturing devices and methods may use computer-controlled light engines to dynamically direct light at a photopolymer. For example, light from the light engine can be dynamically controlled and emitted at a vessel containing a photopolymer to form a part of a 3D object. Objects manufactured using a 3D manufacturing device are typically cleaned and cured after printing. Existing methods of manufacturing a 3D object, however, treat cleaning and curing as post-processing steps that are separate from the printing function of an additive manufacturing device.

The additive manufacturing systems and methods described herein provide several advantages over existing 3D printing methods, including lower manufacturing costs, e.g., because such systems and methods do not require the use of a dynamic light source, such as a laser or digital light processing (DLP) projector. Without requiring a dynamic light source, systems and methods described herein can reduce power consumption and/or make use of commercially available portable power sources (e.g., batteries). Systems and methods disclosed herein also use physical media for storing input data (e.g., models or patterns associated with printed objects), which can be easier to produce and/or more secure than a digital file. Additionally, physical media used with systems and methods described herein can include information on multiple print settings, as opposed to a digital file that describes a geometry to be printed but not any information on how a print or manufacturing process can be executed, e.g., including print settings such as orientation during printing, layer height (e.g., thickness of a single layer of the object being printed in a vertical direction), and/or cure time. Use of a physical media as described herein can also lower an amount of knowledge required of an operator of a 3D manufacturing device, e.g., by not requiring users to interact with software and/or computers or specify settings associated with manufacturing an object.

The disclosure herein relates to a process for manufacturing objects in a layer-by-layer fashion without need for a computer-controlled (or computer-provided) input during the manufacturing process. For example, the process can use physical media implemented as a set of physical masks to form a series of patterns, as opposed to a digital file that describes the design of an object and is used by a compute device to dynamically control a light emitting device to print the object. Additionally, such a process can build 3D objects in a layer-by-layer fashion by curing or solidifying a photopolymer without a digital input file for an object.

In some embodiments, systems and devices disclosed herein can include a 3D printer, a physical media device (e.g., a physical mask storage device (PMSD)), and a vessel (e.g., a print ready vessel (PRV)) that contains a volume of a print material (e.g., a photopolymer such as resin). In addition to these three components, such systems and devices can include one or more of: a build plate (e.g., a print bed or surface upon which the object will be printed) that can be held parallel to a bottom surface of the vessel, an information tag (e.g., near field communications tag) disposed or contained within the build plate or another component, a build arm attached to a print bed and attached to a printer once installed, and/or a volume of cleaning fluid (e.g., alcohol) such that a printed object can be submerged or washed in the cleaning fluid once printing has completed. Optionally, the vessel can be sealed such that the print material is contained in a sealed chamber until the printing process begins and/or throughout a portion of or an entirety of a printing process. In some embodiments, the cleaning fluid can be stored in a contained fashion (e.g., in a sealed or closed off chamber) separate from the print material until printing is completed, at which point the cleaning fluid can be released to wash the printed object.

Systems and devices set forth herein can have particular applications in onsite production of parts or objects, e.g., in aid, industrial, military or consumer applications, where access to skilled operators, computers, the internet, or other resources may not be available but reliability and repeatability are important. The disclosed systems and devices can also have applicability in Science, Technology, Engineering, the Arts and Mathematics (STEAM) applications and other educational applications, including educational programs in areas where internet access or reliable power supply may not be available.

In some embodiments, processes described herein for additive manufacturing uses physical input media to produce an object as opposed to a digital file that describes the design of an object and uses computer control to digitally manipulate light based on the digital file. Accordingly, processes described herein allow for high resolution additive manufacturing without a computer for controlling a dynamic light source and digital data.

In some embodiments, processes described herein can enable commercialization of scalable, low cost, low power, high resolution printers. These processes can be different from currently available processes that use a dynamic light controller in the fabrication of objects. The processes also do not require static transfer of materials and components during a printing process. In some embodiments, a process referred to as the Physical Mask Curing (PMC) process uses an optical light source to project images onto a photopolymer to create a 3D object. In some embodiments, the projected light can be light in the UV range, and physical media (e.g., physical masks) including carbon (e.g., in black ink and toner) printed on paper and polymer substrates can be used to selectively block UV light. In other embodiments, physical media can also be created with other materials and fabrication methods, such as, for example, laser cutting cardboard, hand drawing on paper, etc.

Certain processes for additive manufacturing of photopolymer materials use a digital light controller and/or a dynamic light source. The digital dynamic light source can emit light at a photopolymer to cure specific portions of the photopolymer. Examples of dynamic light sources used in the additive manufacturing field include laser galvanometer systems and digital light projection (DLP) systems. Typically, dynamic light sources are a high cost component of an additive manufacturing device. Accordingly, since processes and devices described herein do not require the use of a dynamic light source, such processes and devices can reduce costs. For example, processes and devices described herein can operate without a dynamic light source by utilizing a physical media masking system or PMC process. The PMC process allows a dynamic light source to be replaced with a non-dynamic light source, e.g., an optical light source such as a light emitting diode (LED) array, which can be significantly lower in cost when compared to a dynamic light source. Additionally or alternatively, processes or devices described herein can be used without software and/or digital data for setting the parameters of an object being printed, and therefore can reduce complexity of user involvement in a printing process. For example, a user operating systems and devices described herein is not required to set the orientation of an object being printed as such information can be set when a physical mask associated with the object is produced and stored on that physical mask or a physical mask carrier. As another example, the user is not required to manipulate support structures (e.g., a print bed) while printing an object because such information can also be set by a manufacturer of the physical mask and stored on that physical mask or a physical mask carrier. These and other advantages increase usability of systems and devices disclosed herein, and can enable users not skilled in the additive manufacturing process and those that do not have access to resources on additive manufacturing to use and adapt such systems and devices to print objects.

In addition to cost advantages, the advantages of using physical masks include increased printing resolution (e.g., ability to resolve details). For example, in a laser-based dynamic light source system, the dot size of the beam is usually around 0.14 mm. DLP systems, another example of a dynamic light source system, usually operate around a 0.05 mm pixel pitch. The PMC process and systems described herein can achieve resolutions greater than or equal to 0.01 mm. In the PMC process, scale and resolution are independent of the light source and/or build area, as opposed to DLP where the larger the projected build area, the lower the resolution. The PMC process and system can achieve this greater resolution because the masking aspect of a digitally controlled dynamic light source can be replaced with a physical mask, which can be produced by 2D printing systems having high resolution (e.g., 48000 dpi). By harnessing the resolution of 2D printing systems, low cost physical masks can be produced, e.g., by using such 2D systems to print patterns on paper or plastic substrates. Such enables PMC printers to have large build areas (e.g., printable volumes) without sacrificing resolution.

Table 1 below depicts example metrics of comparison between the PMC process and systems described herein and existing technologies including stereolithography (SLA) and DLP.

TABLE 1

| Technology | PMC | SLA | FDM |
| --- | --- | --- | --- |
| Dimensions | Any size | Medium | Large |
| Build Volume | Any volume | Small-Large | Small-Extra large |
| Max Z Resolution | 20 μm | 20 μm | 100 μm |
| Max XY Resolution | 8 μm | 140 μm avg. | 100 μm avg. |
| Software | Not required | Required | Required |
| Filetype | Analogue | .STL or .OBJ | .STL or .OBJ |

FIG. 1 schematically depicts an additive manufacturing device 100 (e.g., a 3D printer). The manufacturing device 100 can include or be used with one or more mask(s) 101. The mask(s) 101 can optionally be stored in a mask carrier 130. The mask carrier 130 can be configured to support the mask(s) 101 (e.g., in position between light source(s) 102 and a vessel 103) and/or move the mask(s) 101 (e.g., according to a predefined sequence for printing a 3D object). The mask carrier 130 can include, for example, a reel that stores the mask(s) 101 and advances the mask(s) 101 such that they can be exchanged before or during a printing process. The mask(s) 101 can be manually advanced by a user, e.g., by rotating the reel. Alternatively or additionally, the mask(s) 101 can be advanced automatically by a compute device (e.g., an on-board processor such as controller 160).

In some embodiments, the mask(s) 101 can include a substrate that includes light transmissive and non-transmissive portions. For example, a mask 101 can include a substrate such as a thin paper or polymer that is light transmissive, and portions of that paper or polymer can be printed with a dark ink (e.g., a black ink) to make those portions non-transmissive. Alternatively, a mask 101 can include a more rigid substrate (e.g., a cardboard, a wood, a polymer, a glass, etc.) and portions of the rigid substrate can be etched, cut out, etc. to form transmissive and/or non-transmissive portions. The transmissive and non-transmissive portions of the mask(s) 101 can define patterns that are associated with individual layers of a 3D object. For example, each mask 101 from a set of masks 101 can be associated with a different layer of a 3D object, and collectively the set of masks 101 can be used to print the 3D object by controlling the light that can pass from the light source(s) 102 to a vessel 103, as further described below.

The manufacturing device 100 can include one or more light source(s) 102. The light source(s) 102 can be configured to emit light for curing a print material 120 stored in a vessel 103, as further detailed below. In some embodiments, the light source(s) 102 can be light emitting diode(s) (LED (s)). In some embodiments, the light source(s) 102 can be configured to emit ultraviolet (UV) light that is designed to cure the print material 120. In some embodiments, the light source(s) 102 can include an external light source, such as, for example, a solar light source, an external light bulb, etc.

The manufacturing device 100 can include a vessel 103 that includes one or more chambers. The one or more chambers can store one or more print material(s) 120 (e.g., different types of print material and/or different colors of print material). The print material(s) 120 can be, for example, a photopolymer. Optionally, the one or more chambers can store a cleaning fluid (e.g., alcohol) that can be used to clean a printed 3D object. The vessel 103 can optionally include a fluid transport mechanism 140 that transports fluid (e.g., a print material or a cleaning agent) in and/or out of a chamber of the vessel 103. For example, the fluid transport mechanism 140 can be used to deliver a print material 120 into a chamber for curing (e.g., via light from light source(s) 102) and/or remove excess print material 120 from the chamber after the curing. Additionally or alternatively, the fluid transport mechanism 140 can deliver a cleaning agent into a chamber after an object has been printed, e.g., to clean the object. The fluid transport mechanism 140 can include one or more channels, valves, and/or other components for enabling controlled transport of fluids (e.g., a liquid or air).

The vessel 103 can include a surface suitable for curing the print material 120. The surface can be implemented as a base 104 that is formed of a transparent material or light transmissive material. Examples of suitable materials include fluorinated ethylene propylene (FEP) and polypropylene (PP). In some embodiments, the base 104 can be a membrane that is stretched taut across a housing of the vessel 103. For example, the vessel 103 can include a rigid housing defining a space (e.g., a lumen, a chamber) for containing the print material 120 and a bottom opening, and the membrane forming the base 104 can be stretched across this opening to provide a light transmissive surface for receiving light into the space. The vessel 103 can include and or be configured to receive a print bed 105 (e.g., build plate) that provides an area onto which layers of print material 120 can be printed or cured. The print bed 105 can be positioned such that it extends parallel to the base 104 of the vessel 103. During printing, the location of the print bed 105 can be adjusted to different heights as each layer of an object is printed, e.g., the print bed 105 can initially be one layer height spaced from the base 104 when a first layer of the object is being printed and then be raised as additional layers of the object are being printed. The print bed 105 and the base 104 can be designed such that a printed object adheres with greater force to the print bed 105 than the base 104 during a printing process. As such, the print bed 105 can be raised during the printing to separate layers of the printed object from the base 104 to allow additional print material 120 to flow into the space between the print bed 105 and the base 104 for subsequent curing of additional layers of the object. In some embodiments, a coating (e.g., a hydrophobic material) can be applied to the base 104 that reduces adherence of the cured print material 120 to the base 104.

The print bed 105 can be coupled to a build arm 106, which in turn can be coupled to a support structure 110. The build arm 106 can be configured to move the print bed 105 during operation. For example, the build arm 106 can be configured to move the print bed 105 during a print sequence to raise the print bed 105 to different heights for printing the layers of an object and/or for separating layers of the object from the base 104. As another example, the build arm 106 can be can be configured to move the print bed 105 to submerge a printed object in a cleaning agent after a print process. Movement of the build arm 106 can be controlled by a compute device (e.g., an on-board processor such as controller 160) or manually adjusted by a user. When controlled by a compute device, the compute device can use information obtained regarding the object being printed and/or the mask(s) 101 associated with that object to determine which heights to set the print bed 105 to, e.g., for curing each layer of the object. In some embodiments, the compute device can obtain this information, for example, from an information tag (e.g., NFC tag) located on the mask(s) 101, mask carrier 130, vessel 130, and/or other suitable component of the device 100. For example, the compute device can be operatively coupled to one or more sensors (e.g., a NFC tag reader) located on the manufacturing device 100, and can use those sensors to capture information regarding the object and its associated mask(s) 101.

In some embodiments, the manufacturing device 100 can include a support structure 110, such as, for example, a body or frame. The support structure 110 can support the light source(s) 102, mask carrier 130, mask(s) 101, and vessel 103 in operative positions relative to one another, e.g., such that an object can be printed using such components. In some embodiments, the vessel 103 and/or mask carrier 130 (or other components of the manufacturing device 100) can be designed to be selectively coupleable (e.g., attachable and removable) from the manufacturing device 100. For example, the vessel 103 and/or mask carrier 130 can be coupled to the support structure 110 (e.g., received within slots and/or openings in the support structure 110) prior to a printing process, and then removed after the printing process and optionally discarded. In some embodiments, the vessel 103 can be implemented as a disposable vessel (e.g., a PRV) that includes a sufficient volume of print material 120 for printing an object, the print bed 105, and the build arm 106, as further described below with reference to FIGS. 13A-14B. In some embodiments, the vessel 103 can form a sealed chamber for storing the print material 120 prior to printing, which can be unsealed and/or remain sealed during a printing process.

The manufacturing device 100 can optionally include an image adjustment mechanism 108 that is configured to adjust images produced using the mask(s) 101 and light source(s) 102. More specifically, the light source(s) 102 can be configured to emit light toward a mask 101 that includes light transmissive and non-transmissive portions. These transmissive and non-transmissive portions of the mask 101 can define a pattern that is associated with one or more layer(s) of an object being printed. In some embodiments, additional mask(s) 101 can be exchanged for an initial mask 101 to define additional layers of the object being printed. Based on the pattern or transmissive and non-transmissive portions of the mask 101, the light being directed at the mask 101 can produce an image beyond the mask 101. This image can be received by an image adjustment mechanism 108, which can modify the image prior to that image being received through the base 104 and into the vessel 103 for curing a layer of the object. The image adjustment mechanism 108 can include, for example, one or more lenses and one or more mechanical and/or electrical components for moving the lenses relative to the mask(s) 101 and light source(s) 102. In some embodiments, the lenses can be used to increase or decrease a size of an image produced by the light source(s) 102 and mask(s) 101.

In some embodiments, when the components of the manufacturing device 100 are assembled, the mask(s) 101 can be positioned between the light source(s) 120 and the vessel 103. In embodiments including an image adjustment mechanism 108, the image adjustment mechanism 108 can be positioned between the mask(s) 101 and the base 104. Such arrangements are further described with reference to other figures described below.

The manufacturing device 110 can include a controller 160, e.g., an on-board processor or compute device and memory. The controller 160 can control the operation of one or more components of the manufacturing device 110. For example, the controller 160 can control the light source(s) 102 to emit light during specific time periods of a print process. In embodiments including a mask carrier 130 with a reel of mask(s) 101, the controller 160 can control the operation of the mask carrier 130 to advance individual mask(s) 101 such that the mask(s) 101 can be exchanged for one another during a print process. In embodiments including an image adjustment mechanism 108, the controller 160 can control a position and/or orientation of one or more components of the image adjustment mechanism 108 (e.g., lenses). In some embodiments, the controller 160 can control the movement of the build arm 106 and print bed 105 during a printing and/or cleaning process.

In some embodiments, the controller 160 can be configured to receive user inputs (e.g., via user interface 150) and control the operation of the manufacturing device 100 based on such inputs. For example, the controller 160 can receive an input from a user requesting a print of a 3D object, and in response to that input, control one or more of the build arm 106, print bed 105, image adjustment mechanism 108, mask carrier 130, mask(s) 101, or light source(s) 102 to print the 3D object and/or clean the 3D object after printing. The controller 160 can be any suitable type of processing device, including, for example, a general purpose processor, a Field Programmable Gate Array (FPGA), an Application Specific Integrated Circuit (ASIC), a Digital Signal Processor (DSP), a microprocessor, and/or the like. The controller 160 can be operatively coupled to each component of the manufacturing device 100 that it is configured to communicate with (e.g., receive and/or send data) and/or control.

In some embodiments, the controller 160 can be operatively coupled to one or more sensors coupled to and/or integrated into the manufacturing device 100. The one or more sensors can include, for example, image capture devices (e.g., cameras), light sensors, position sensors, force sensors, temperature sensors, pressure sensors, motion sensors, sound detectors, etc. The controller 160 can receive information form the one or more sensors and use that information to confirm installation and/or proper positioning of one or more components of the manufacturing device 100 (e.g., the vessel 103, the mask carrier 130, the mask(s) 101) and/or to confirm proper operation of the manufacturing device 100. In some embodiments, the controller 160 can be configured to present alerts (e.g., error signals) or other information to a user, e.g., via user interface 150, based on information collected by the one or more sensors.

User interface 150 can include one or more components that are configured to receive inputs and send outputs to other devices and/or a user operating the manufacturing device 100. For example, user interface 150 can include a display device (e.g., a display, a touch screen, etc.), an audio device (e.g., a microphone, a speaker), or other devices configured for receiving an input and/or generating an output to a user.

Figure 2:
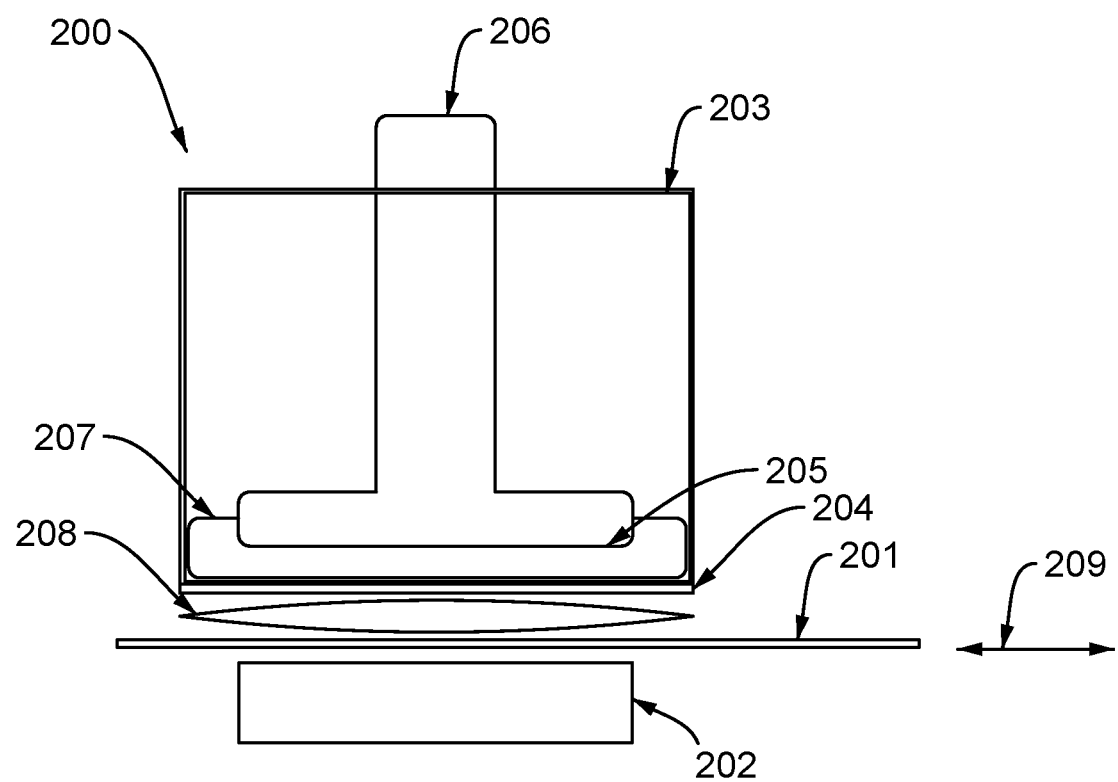
FIG. 2 is a schematic illustration of an additive manufacturing device, according to embodiments disclosed herein.

FIG. 2 schematically depicts an additive manufacturing device 200 (e.g., a 3D printing device), according to embodiments described herein. The additive manufacturing device 200 can include components that are structurally and/or functionally similar to other additive manufacturing devices described herein (e.g., additive manufacturing device 100). The manufacturing device 200 can include a light source 202, a mask 201, an image adjustment mechanism 208, a vessel 203 including a base 204 and an area 207 including a volume of photopolymer (e.g., a print material), a print bed 205, and a build arm 206.

Figure 11:
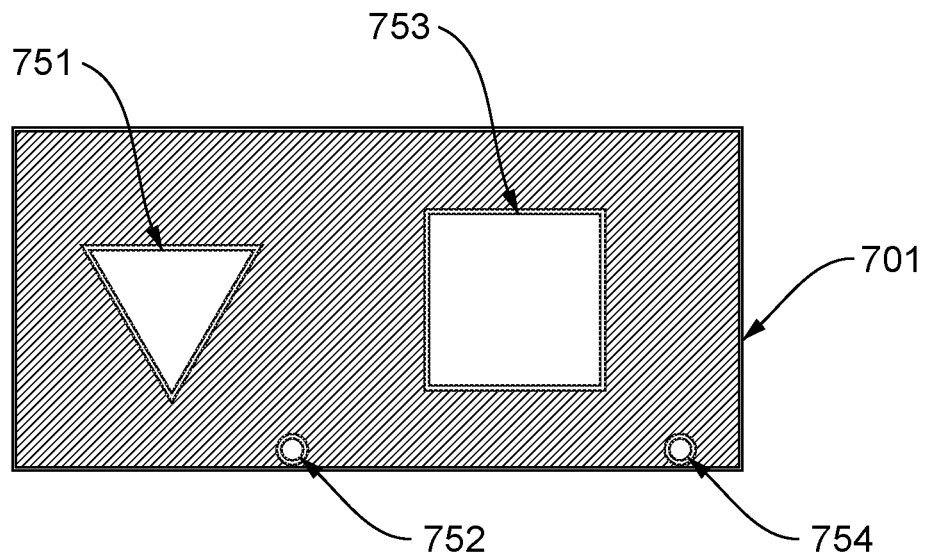
FIG. 11 is a top view of a set of masks for use with an additive manufacturing device, according to embodiments disclosed herein.
Figure 17:
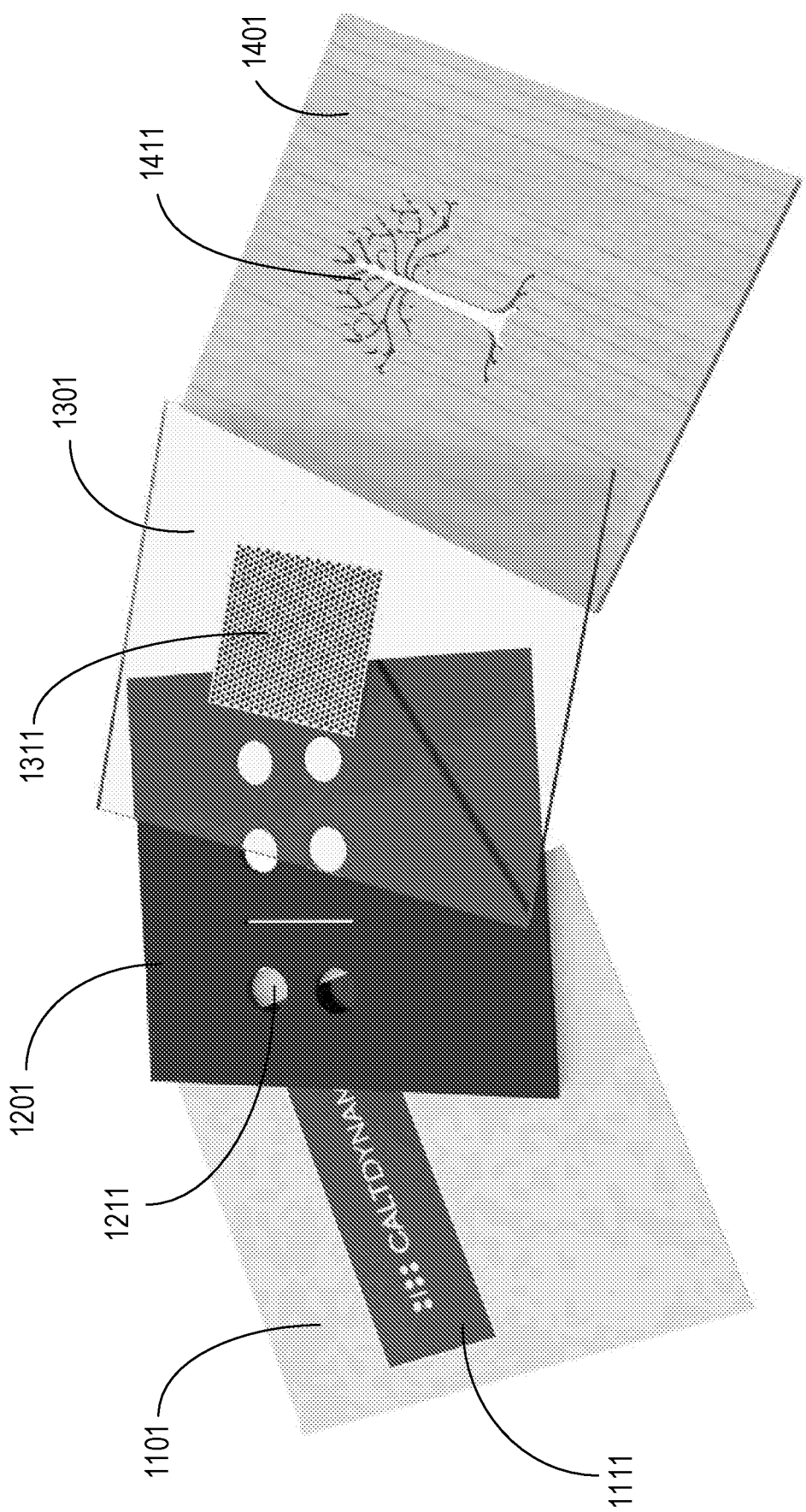
FIG. 17 are perspective views of different masks for use with an additive manufacturing device, according to embodiments disclosed herein.

The mask 201 can optionally be exchanged with other masks, e.g., via a reel or other suitable device, as represented by arrow 209. The mask 201 can include a pattern or image that is associated with a 2D slice of a negative of a 3D object. Each slice can represent the geometry of the 3D object at a particular increments of height. For example, a first slice can represent a bottom of the object as viewed from above. The second slice can represent the geometry of the object one layer height higher than the first slice, and so on until the last slice, which can represent the top of the object. Examples of images that can be printed on the mask 201 (and other masks described herein) are depicted in FIGS. 11 and 17.

Figure 3:
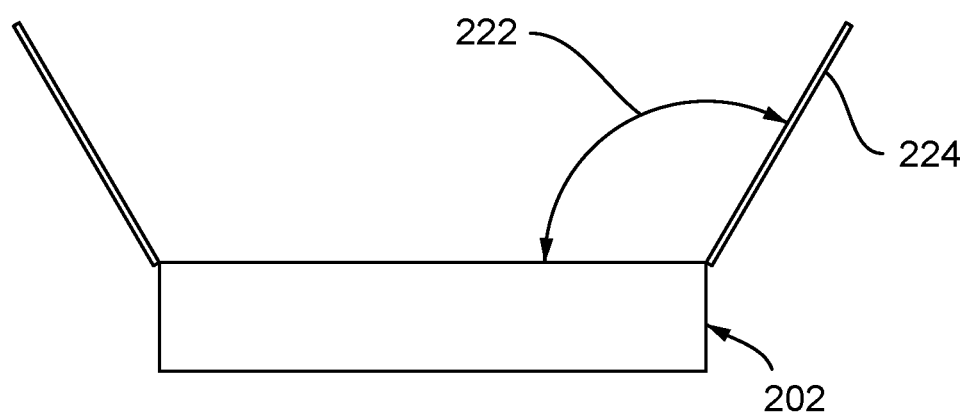
FIG. 3 is a schematic illustration of a light source of an additive manufacturing device, according to embodiments disclosed herein.

The light source 202 can include one or more LEDs or another suitable light source (e.g., a light bulb). The light source 202 can be a non-dynamic light source. In some embodiments, the light source 202 can be configured to emit UV light (e.g., light with a wavelength within the UV spectrum, e.g., below 420 nm) or other light suitable for curing the print material contained within the area 207 of the vessel 203. In some embodiments, the angle of emission 222 can be low to increase an amount of light that hits the mask 201 at a perpendicular angle. As shown in FIG. 3, the light source 202 can emit light 224 with an angle of emission 222 that is generally perpendicular (e.g., at a 90 degree angle±10%) to a top surface of the light source 202. Stated differently, the light source 202 can be configured to emit light at an angle of about 90 degrees (e.g., 90 degrees±10%), and desirably at 90 degrees, with respect to a surface of a particular light emission unit (e.g., LED).

The vessel 203 containing the volume of photopolymer can be positioned above the mask 201. The base 204 of the vessel 203 can be formed of an optically clear or light transmissive material that enables light emitted by the light source 202 to enter the area 208 of the vessel 203 containing the photopolymer, such that a portion of the photopolymer can be cured against an inner surface of the base 204. In some embodiments, the base 204 can be formed of FEP or a similar material. The material can be designed to allow for separation of a cured area or portion of photopolymer form the base 204 with a low force.

The print bed 205 is configured to provide a flat surface onto which layers of an object can be printed. During printing, a portion of the photopolymer between the print bed 205 and the base 204 of the vessel can be cured, and be forced upon the bottom surface of the print bed 205 with a greater force than to the base 204 of the vessel 203. Accordingly, when the print bed 205 is raised away from the base 204, the cured photopolymer can separate from the base 205. Subsequent curing of additional layers of photopolymer can be achieved by re-positioning the print bed 205 relative to the base 204 at incremental layer heights, such that additional volumes of photopolymer can enter into the space between the print bed 205 and the base 204 to be cured.

The build arm 206 can be coupled to the print bed 205, and be used to move the print bed 205 vertically (e.g., away from and toward the base 204 in a orthogonal direction) during a printing process. The image adjustment mechanism 208 can include one or more lenses, which can be used to scale an image projected by the light 202 and mask 201.

In operation (e.g., to manufacture a particular 3D object using the PMC process), the print bed 205 can be lowered into a bottom portion of the vessel 203 such that a bottom surface of the print bed 205 is one-layer height away from the base 204 of the vessel 203. Such lowering can be accomplished via an on-board processor (e.g., controller 160) of the manufacturing device 200. The print bed 205 can be attached to the build arm 206, which in turn can be attached to another portion of the manufacturing device 200 (e.g., a support structure, such as, for example, support structure 110), which can facilitate movement of the print bed 205 and build arm 206. The light source 202 can then be activated such that it emits light though the transmissive portions of the mask 201 and subsequently through the base 204 of the vessel 203 and into contact with a portion of the photopolymer within, according to an image or pattern printed on the mask 201. Optionally, an image adjustment mechanism 208, such as a lens or similar apparatus, can be placed between the mask 201 and the base 204 of the vessel 203. In some embodiments, the lens can be mounted to a lens mount such that the lens can be moved in one or more directions (e.g., up and down, about an axis, etc.), allowing for scaling or optical modification of the images and ultimately the object being printed. Based on the pattern formed by the light that is transmitted through the mask 201 (and the light that is blocked by the non-transmissive portions of the mask 201), a layer of the object can be cured and printed on the print bed 205. The print bed 205 with the cured layer of photopolymer is then raised while separating from the base 204 of the vessel 203. Once separated, the print bed 205 can be lowered into the vessel 203 again such that a bottom surface of the print bed 205 is two-layer heights above the base 204 of the vessel 203. Optionally, the mask 201 can be exchanged, depending on the specific requirements of the additive manufacturing process for the particular object. In an embodiment, the exchange of the mask can involve rolling a reel of masks forward until the next mask is aligned with the light source 202, according to the direction shown with arrow 9 in FIG. 2. This process of curing a layer of photopolymer, separating the print bed 205 from the base 204 of the vessel 203, and then moving the print bed 205 back into position can repeat layer-by-layer until the object has been manufactured.

Figure 4:
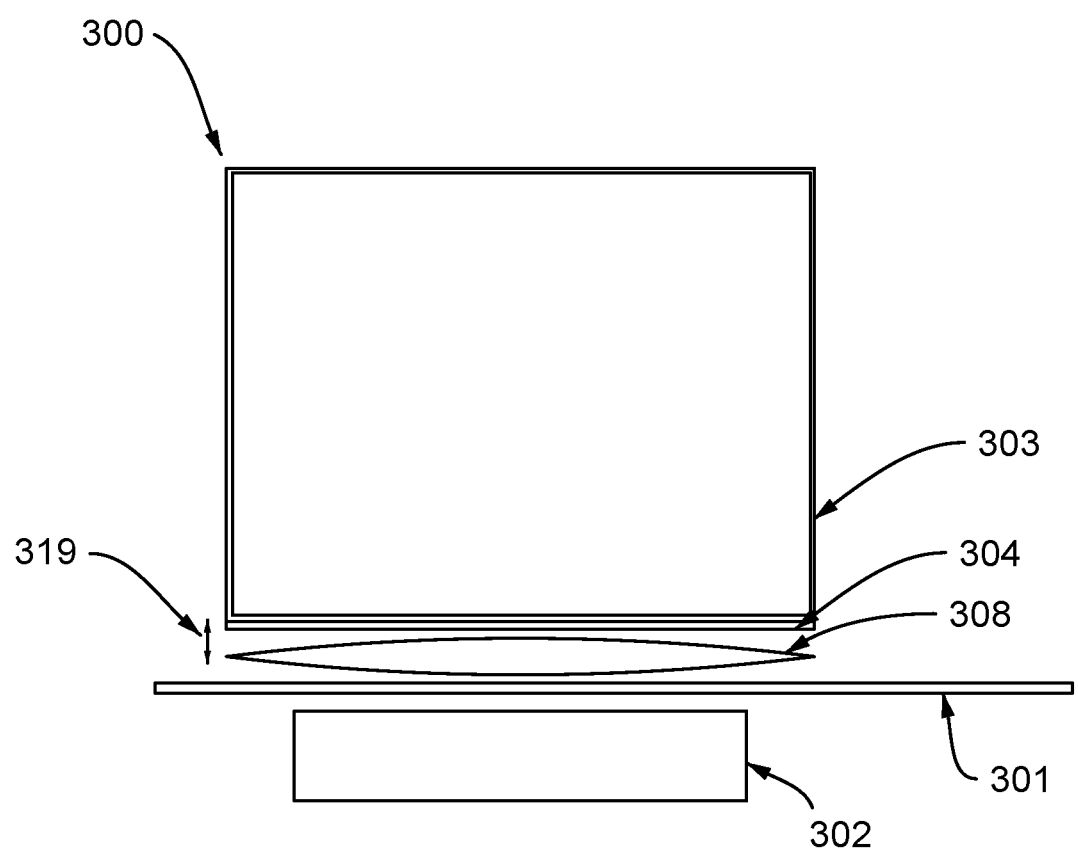
FIG. 4 is a schematic illustration of an additive manufacturing device, according to embodiments disclosed herein.

FIG. 4 schematically depicts another example additive manufacturing device 300, e.g., that can be used with the PMC printing processes described herein. The manufacturing device 300 can include components that are structurally and/or functionally similar to other manufacturing devices described herein (e.g., manufacturing devices 100, 200). The manufacturing device 300 can include a light source 302, a physical mask 301, an image adjustment mechanism 308, a base 304, and a vessel 303.

The image adjustment mechanism 308 can include one or more lenses, which can be movable in a direction represented by an arrow 319 between the base 204 of the vessel 203 and a top surface of the light source 302. Similar to that described above with reference to the devices 100 and 200 depicted in FIGS. 1 and 2, movement of the lenses can enable scaling or other optical modifications of the images produced by the light emitted by the light source 302 through the mask 301.

Figure 5:
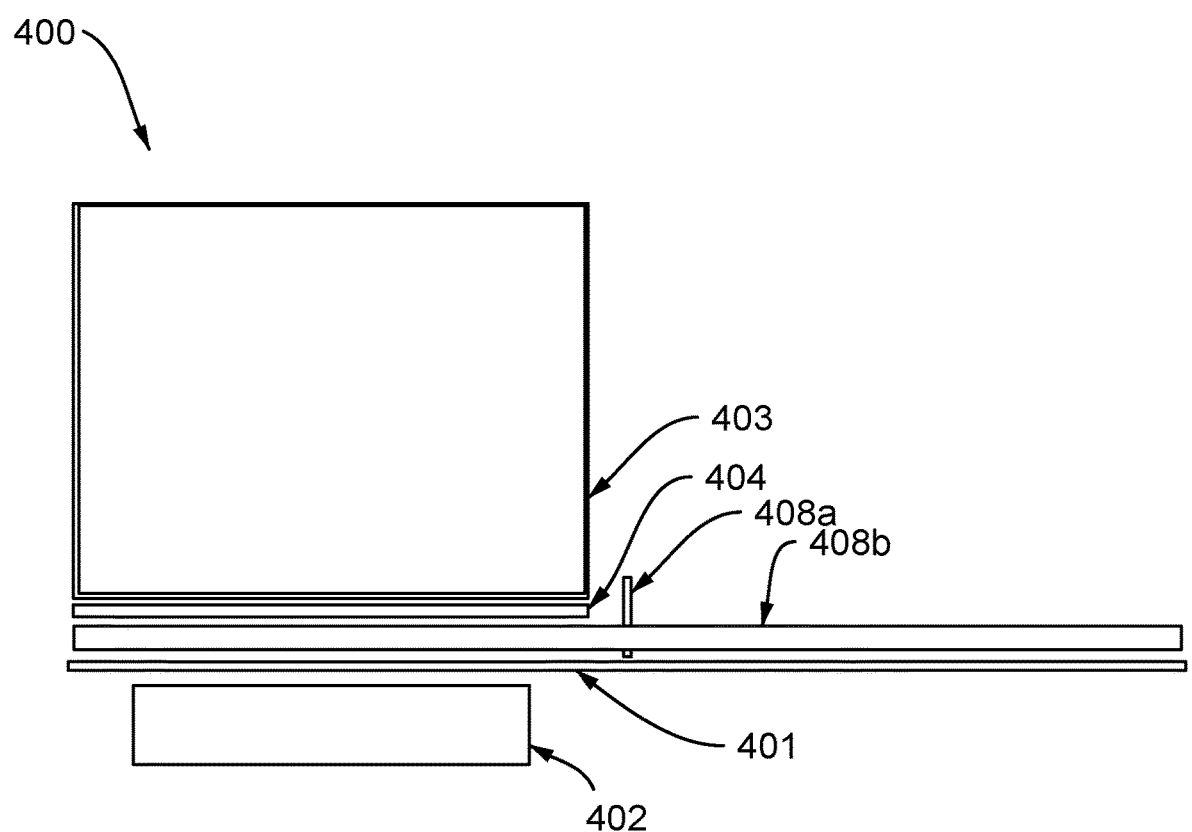
FIG. 5 is a schematic illustration of an additive manufacturing device, according to embodiments disclosed herein.

FIG. 5 schematically depicts another example additive manufacturing device 400, e.g., that can be used with the PMC printing processes described herein. The manufacturing device 400 can include components that are structurally and/or functionally similar to other manufacturing devices described herein (e.g., manufacturing devices 100, 200, 300). The manufacturing device 400 can include a light source 402, a physical mask 401, an image adjustment mechanism including components 408a, 408b, a base 404, and a vessel 403.

Figure 6:
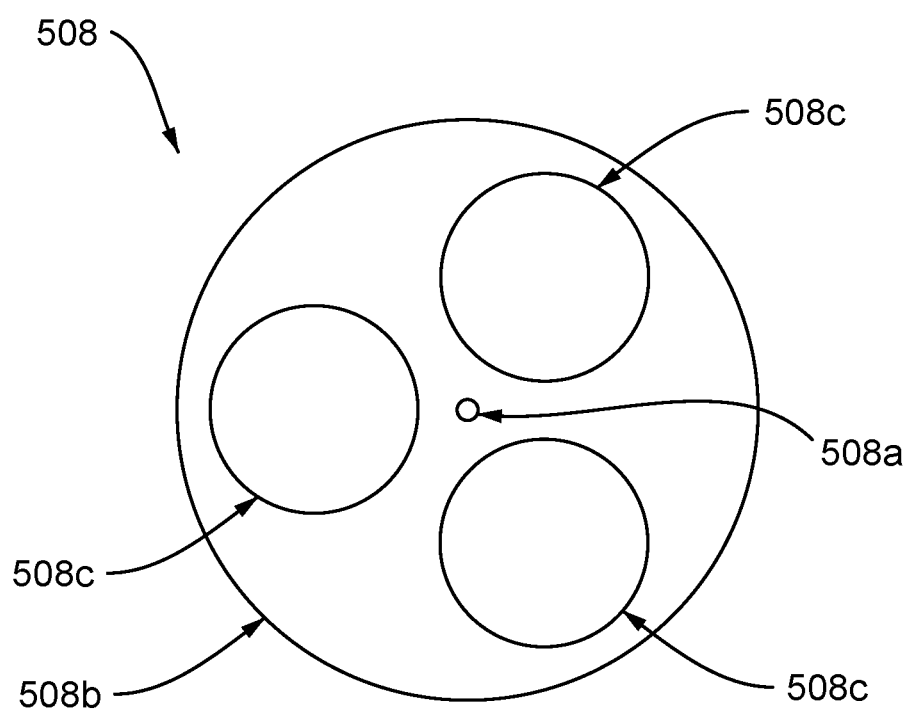
FIG. 6 is a schematic illustration of a lens system of an additive manufacturing device, according to embodiments disclosed herein.

The image adjustment mechanism can include a central rotary axel 408a and a mounting plate 408b including a plurality of lenses. FIG. 6 provides a more detailed view of an example image adjustment mechanism 508 including a rotary axel 508a, a mounting plate 508b, and a plurality of lenses 508c. The plurality of lenses 508c can include different lenses, e.g., with different focal lengths, sharpness, etc. The mounting plate 508b can be rotated to position different ones of the plurality of lenses 508c between a mask (e.g., mask 401) and a vessel (e.g., vessel 403), depending on the specific requirements of a print.

While FIGS. 4 and 5 depict different image adjustment mechanisms 308, 408 that are movable in different ways, it can be appreciated that image adjustment mechanisms used with the additive manufacturing devices described herein can implement one or both types of movements, as well as additional movements not specifically depicted in FIGS. 4 and 5.

Figure 7:
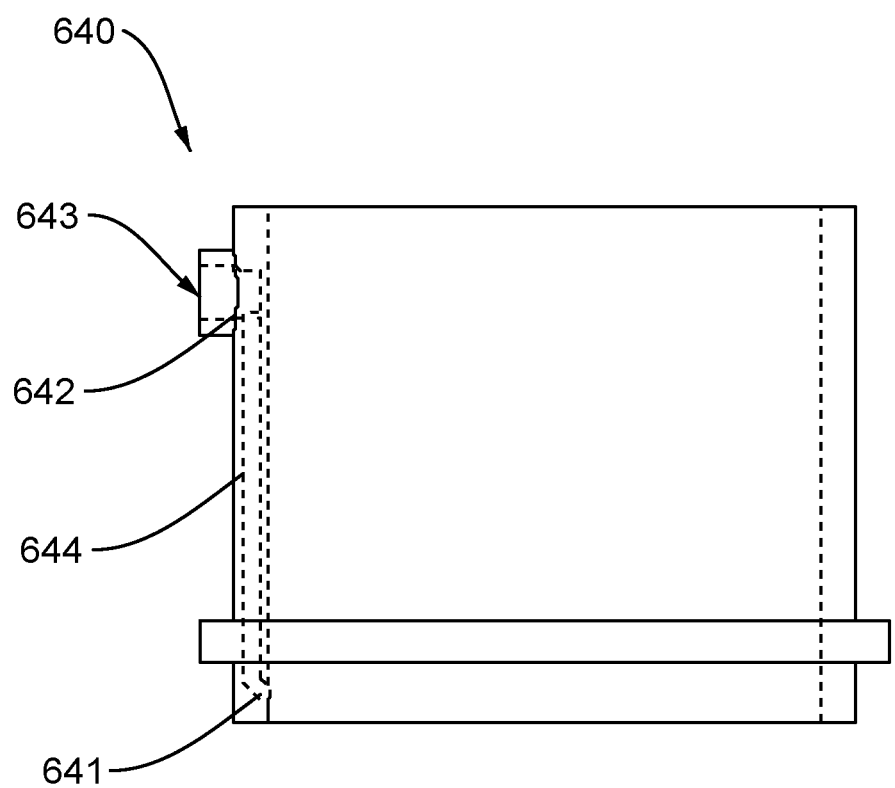
FIG. 7 is a schematic illustration of a fluid transport mechanism of an additive manufacturing device, according to embodiments disclosed herein.

FIG. 7 schematically depicts an example of a fluid transport mechanism 640 that can be used with the additive manufacturing devices described herein (e.g., manufacturing devices 100, 200, 300). The fluid transport mechanism 640 can include a container for delivering fluids into a printing chamber (e.g., a chamber of vessel 103, 203, 303). The container can have an internal hollow section 644 (e.g., a lumen or channel) including two orifices 641, 642, but it can be appreciated that any number of internal hollows and associated orifices can be employed. In some embodiments, the hollow 644 can be lined with materials that are hydrophobic or can be absorbed in or dissolved by a fluid flowing through the hollow. The container can include a connector 643 that allows for the connection of a pipe or similar apparatus on the outside of the container. The first orifice 642 can be located at or near the connector 643, and the second orifice 641 can be located on an inside of the container (e.g., at or near the chamber of the vessel). The internal hollow section 644 can be used for inflow or outflow of fluids. In an embodiment, a syringe or other fluid source can be attached to the first orifice 642 via a pipe or tubing that connects to the connector 643, but any appreciable mechanism can be used to supply or withdraw fluid into or from the fluid transport mechanism 640 (e.g., pumping, vacuum, etc.).

Figure 8:
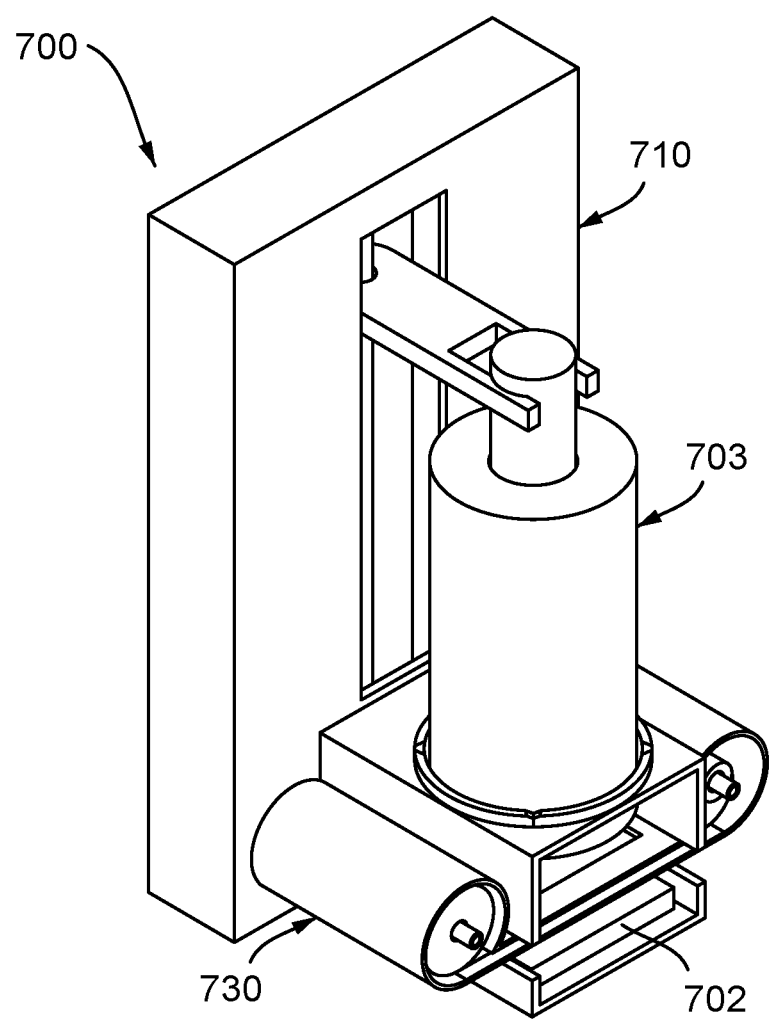
FIG. 8 is a perspective view of an additive manufacturing device, according to embodiments disclosed herein.

FIG. 8 provides a perspective view of an example additive manufacturing device 700, according to embodiments described herein. The manufacturing device 700 can include components that are structurally and/or functionally similar to other manufacturing devices described herein (e.g., manufacturing devices 100, 200, 300, 400). The manufacturing device 700 includes, for example, a light source 702, a mask carrier 730, a vessel 703, and a support structure 710.

The vessel 703 can be a PRV or ready-to-print vessel, e.g., a vessel that is pre-loaded with sufficient photopolymer (e.g., print material) and components for printing one or more 3D objects. The mask carrier 730 can be a PSMD, e.g., a device that contains a set of physical masks. In some embodiments, the mask carrier 730 can be designed to contain a single mask and can be referred to as a Single Physical Mask Storage Device (SPMSD).

Figure 9:
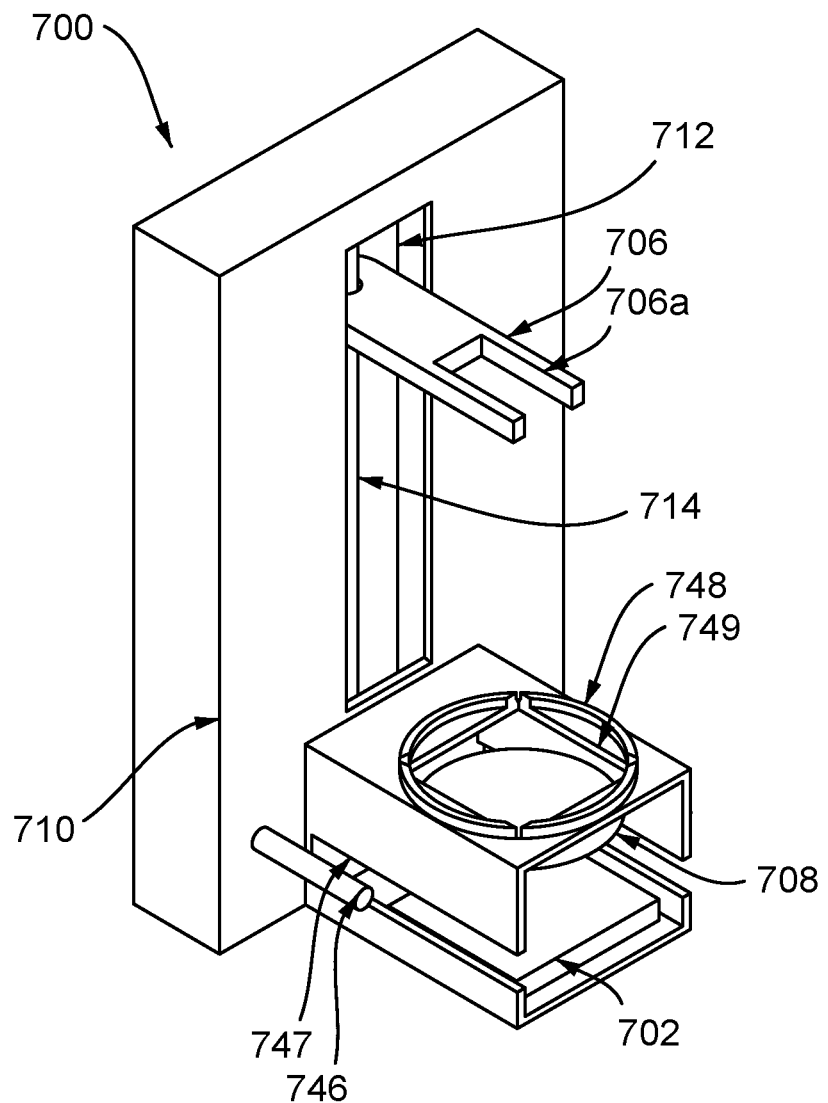
FIG. 9 is a perspective view of a support structure of an additive manufacturing device, according to embodiments disclosed herein.

The support structure 710 can represent a reusable portion of the additive manufacturing device 700 and be referred to as the printer. The support structure 710 can include a housing that supports a plurality of mechanical components (e.g., motors, linear tracks, etc.), the light source 702, and one or more sensory components (e.g., sensors). The support structure 710 can be configured to removably receive the vessel 703 and the mask carrier 730. As depicted in FIG. 9, with the vessel 703 and mask carrier 730 removed for illustration purposes, the support structure 710 includes an orifice 748 (e.g., opening or recess) that can receive a portion of the vessel 703 (e.g., a PRV) and an orifice 747 (e.g., a slot) that can receive a portion of the mask carrier 730 (e.g., a PSMD or SPMSD). Optionally, the support structure 710 can include a sensor or reader (e.g., NFC reader or similar apparatus) that can identify the mask carrier 730 that is inserted into the support structure 710, e.g., via reading an identification tag (e.g., a NFC tag).

In some embodiments, the manufacturing device 700 can be configured to rotate a reel of physical masks, e.g., along axels 746, such that different masks can be positioned in an orifice 749 aligned with an opening of the mask carrier 730, as further described with reference to FIGS. 10-12. As described above, each mask can include light transmissive and non-transmissive portions that define a pattern associated with a slice of a 3D object. The manufacturing device 700 can contain a sensory element (e.g., a sensor) that can interact with components of the masks or mask carrier 730, allowing the device 700 to determine whether a current mask is aligned with the light source 702 and/or an identity or other settings associated with the current mask.

The light source 702 can include one or more LEDs that have a wavelength within a UV spectrum. The light source 702 can be a non-dynamic light source, such that the manufacturing device 700 in operation consumes less power as compared to conventional dynamic light source systems (e.g., DLP and laser-based systems). The light source 702 can be positioned in alignment with the window of the mask carrier 730. During printing, a layer of photopolymer contained within the vessel 703 is exposed and cured by activating the light source 702, such that the light source 702 produces light, some of which passes through the transmissive portions of a particular mask and some of which is blocked by the non-transmissive portions of the particular mask. The light which does pass through the particular mask then passes through the base of the vessel 703 and subsequently solidifies the photopolymer (e.g., resin) that it strikes.

Optionally, the manufacturing device 700 can contain an image adjustment mechanism implemented as a lens or a plurality or lenses 708, which can be adjusted vertically between a bottom of the vessel 703 and a top surface of the light source 702 or adjusted in a rotatory fashion.

For moving a print bed (disposed within the vessel 703, not depicted) and a build arm 706, the 3D printer can include one or more tracks or linear guides 712, 714. The build arm 706 can be movable along the tracks 712, 714, with one end of the build arm 706 being attached to a structure of the tracks 712, 714 and another end of the build arm 706 being coupleable (e.g., via a feature 706a) to a portion of the vessel 703 that is attached to the print bed. In some embodiments, the movement of the components of the tracks 712, 714 and/or build arm 706 can be motorised and controlled electronically (e.g., using a processor such as that of controller 160).

In some embodiments, the manufacturing device 700 can operate from a portable power source (e.g., a battery), e.g., since the device 700 does not require a dynamic light source. This increases the applicability of the device 700 in locations without access to a stationary power source, e.g., such as in in field service and aid applications.

Figure 10:
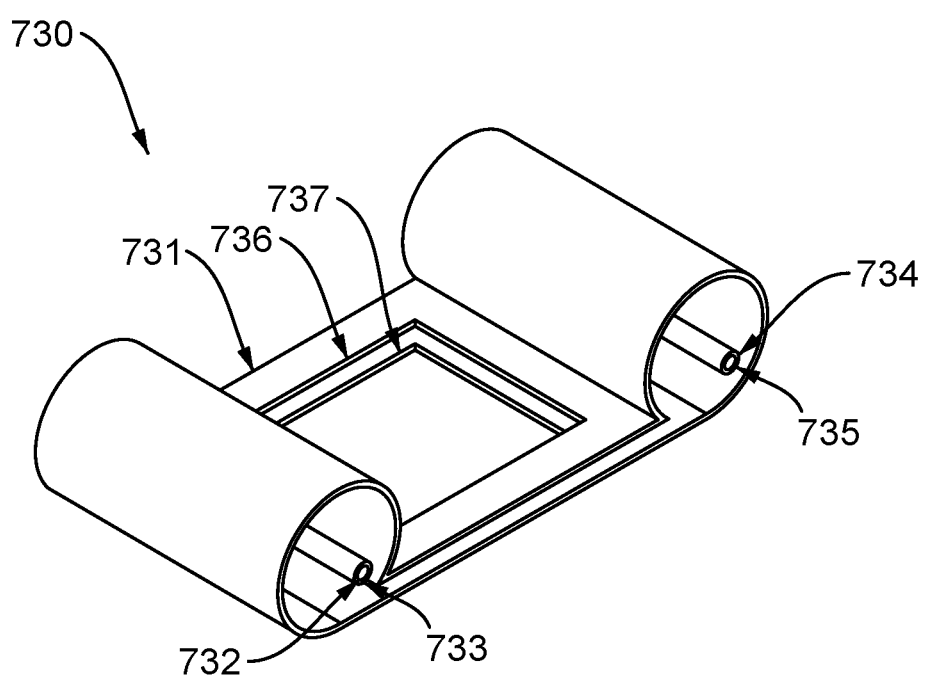
FIG. 10 is a perspective view of a mask carrier of an additive manufacturing device, according to embodiments disclosed herein.
Figure 12:
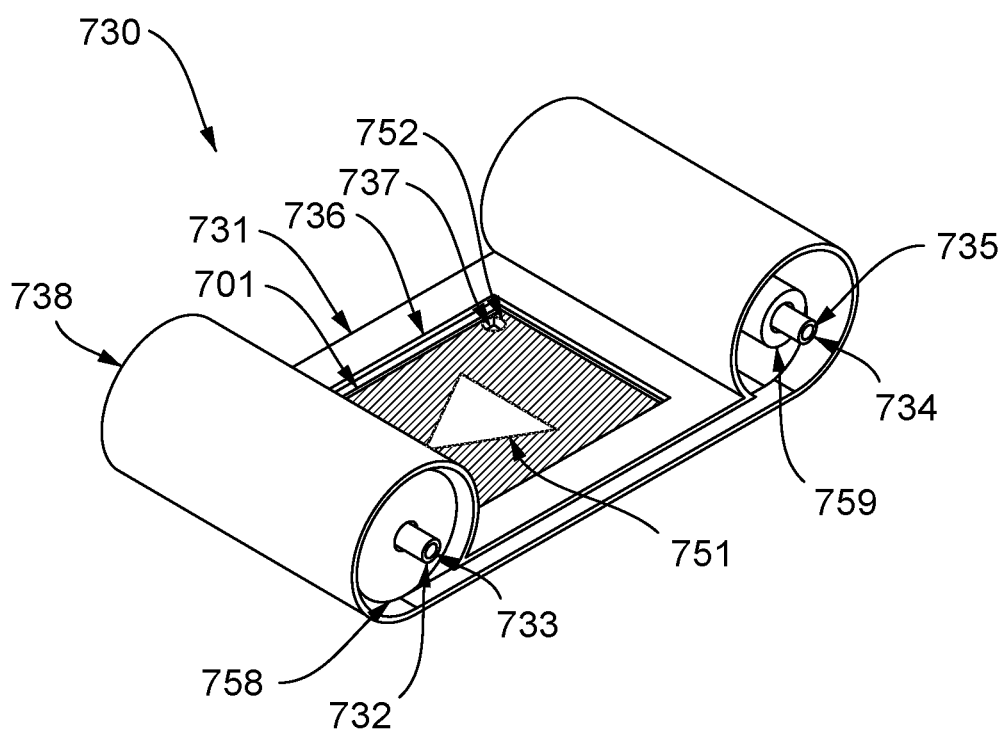
FIG. 12 is a perspective view of a mask carrier with a set of masks for use with an additive manufacturing device, according to embodiments disclosed herein.

FIGS. 10-12 provide more detailed views of the mask carrier 730, which can store one or more masks 701. FIG. 11 depicts example physical media or mask(s) 731 that can be used with the mask carrier 730. The mask(s) 701 include a two-dimensional images that can be used to create a 3D object. As depicted in FIG. 11, the mask includes a triangular transmissive section 751, which can produce a triangular prism when printed layer after layer. The mask also includes a square section 753, which can produce a rectangular prism or cube when printed depending on the number of layers cured. The shaded area in the mask(s) 701 represents a non-light transmissive portion that can block light (e.g., UV light), while the sections 751, 753 can enable transmission of light. Optionally, the mask(s) 701 can include sensory components 752, 754, which can be used to sense a position of the mask and/or identify a particular mask. While sensory components 752, 754 are depicted, it can be appreciated that additional methods of determining a location and/or identity of a mask can be used. For example, markings or printed patterns in the non-transmissive portions can be used to identify a location and/or identity of a mask. In some embodiments, the manufacturing device 700 can also include image capture devices (e.g., cameras) or other suitable sensors that can detect a position and/or identify a particular mask.

FIG. 10 depicts the mask carrier 730 without a reel of masks (e.g., plurality of masks) installed. FIG. 12 depicts the mask carrier 730 with the reel of masks installed. As noted above, the mask carrier 730 with the mask(s) 701 installed can be a PMSD. The PMSD enables a 3D object to be manufacturing without requiring advanced computer-controlled systems that dynamically control light sources to direct light at specific portions of a build area, thereby reducing device complexity in operation and manufacturing.

The mask carrier can include a housing 731 that contains a reel of images or mask(s) 701 printed on a light transmissive material (e.g., UV transmissive material). In an embodiment, the ink or other non-light transmissive material printed (or one or more of any set of materials for blocking light transmission) on the mask(s) 701 can block light (e.g., UV light) to define the 2D geometric information of a 3D object associated with that particular reel. Alternatively or additionally, other methods can also be used to create a mask, such as, for example, etching or adhering non-light transmissive materials onto a light transmissive substrate, or laser cutting sheet materials that are non-light transmissive such that the cut-out portions are light transmissive and any remaining portion of the materials form the non-light transmissive portion of the mask(s) 701. To provide a specific example, a photopolymer can be cured onto a UV transmissive substrate to block light in the areas of cured photopolymer. Any suitable material or feature for blocking light in desired areas and allowing light transmission in the relevant wavelength of light through other areas of a physical medium can be used. The combination of light transmissive substrate (or cut-outs) with a non-UV transmissive material can be used to generate a mask, such as mask(s) 701. The mask carrier 730 can include portions that are shaped and/or insertable into receiving portions and/or elements of the support structure or housing 710 of manufacturing device (e.g., through an orifice 747). The mask carrier 730 can have openings 736, 737 on both sides that exposes a portion of the reel between the rolled ends 758, 759, and can be aligned with both the light source 702 and the vessel 703 when installed in the additive manufacturing device 700. Optionally, as noted above, the additive manufacturing device 700 can include a lens 708, which can be positioned on an upper side of the first orifice 737, e.g., above the exposed portion of the reel. The mask carrier can optionally include a tag (e.g., NFC tag) or other identification mechanism 738 (e.g., on its housing) that is readable by one or more sensors of the additive manufacturing device 700 and/or user. The tag or other identification mechanism 738 can store information about the mask carrier 730 and/or mask(s) 701, such as, for example, layer heights of the print, exposure time of the photopolymer (e.g., resin), distance between masks, or size of masks.

The housing 731 can be inserted into the support structure 710 of the additive manufacturing device 700. The housing 731 can contain subcomponent axel(s) 732, 734 upon which the reel of mask(s) 701 can be rolled and/or stored. These subcomponent axel(s) 732, 734 can be an injection moulded component and/or separately constructed components. The subcomponent axel(s) 732, 734 incorporate mechanical features to enable axle(s) 733, 735 to be driven, e.g., manually or by an electric motor (e.g., controlled by a controller 160) in any suitable manner. In operation, the mask(s) 701 are exchanged as an object is being printed. The light source 702 can shine light through a mask 701, where the mask 701 blocks light in the desired areas. The light that makes it through the mask 701 can pass through the bottom of the vessel 703 (e.g., a membrane or transparent base) and strikes a photopolymer contained in the vessel 703. As the object is printed, the build arm 706 is raised and the light passing through the mask(s) 701 (and subsequently exchanged mask (s) 701) strikes the current layer of photopolymer of the object being printed.

Figures 13A, 13B:
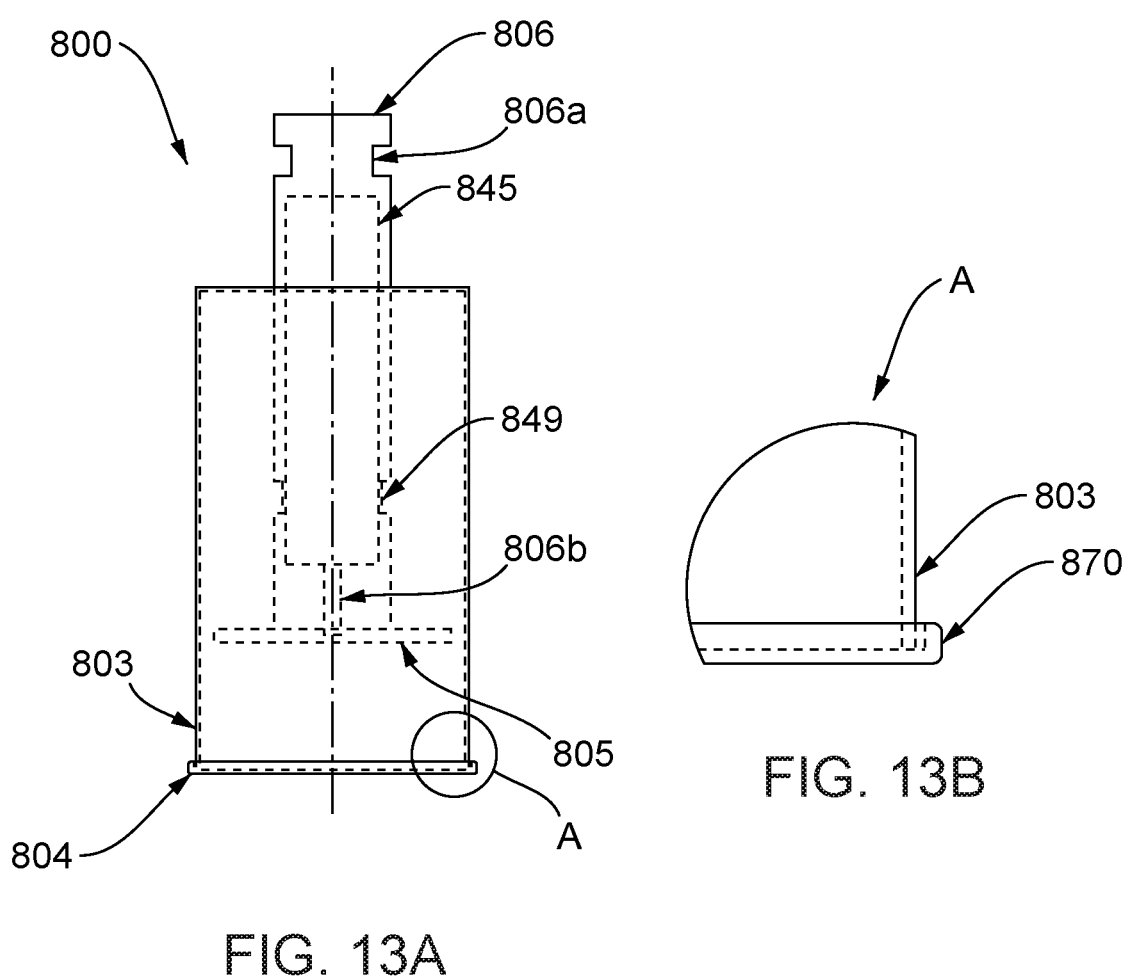
FIG. 13A is a cross-sectional view of a vessel of an additive manufacturing device, according to embodiments disclosed herein.
FIG. 13B is a closer view of a portion of the vessel of FIG. 13A.

FIGS. 13A, 13B, 14A, and 14B depict different views of a vessel 800. FIG. 13A depicts a cross-sectional view of the vessel 800, with FIG. 13B depicting a detailed view of a region A shown in FIG. 13A. FIGS. 14A and 14B show the vessel 800 with a build arm 806 in two different configurations, as further described below. The vessel 800 can be a print-ready vessel or PRV, as described herein. The vessel 800 can include a sealed container 803, a base 804, a build plate 805, and a build arm 806. The container 803 can be sealed via a seal 868. Optionally, the vessel 800 can include a tag (e.g., NFC tag), electronic components, chemical compounds, power storage devices, a computing device (e.g., processor), a communication element, etc., such that the vessel 800 can be connectable to one or more other devices and share and receive data from such devices.

The sealed container 803 can contain a photopolymer (e.g., resin) having various volumes. The photopolymer can be sealed within the vessel 800 until the printing process starts and/or throughout a portion of or an entirety of a printing process. In an embodiment, the sealing can be achieved using a perforable sticker 868 or a similar structure (e.g., a membrane, an elastic component), or via a geometry of the container 803 and/or the build arm 806, which can be released at the start of a printing process, e.g., by applying force downward on the build arm 806 (manually or via an automated process). In some embodiments, an additional seal can be provided between edges of the perforable sticker 868 or other structure and a surface of the build arm 806 such that the photopolymer within a chamber defined by the vessel 800 remains sealed before and/or during a printing process. In some embodiments, the sealed nature of the container 803 can ensure that each print takes place in a clean environment, which can reduce issues with printing in environments including containments or other unfavourable conditions.

The build arm 806 can include a hollow section 845 (e.g., inner lumen or channel) and an attachment mechanism 806a. The attachment mechanism 806a can enable attachment of the build arm 806 to a portion of an additive manufacturing device as described herein, such that the build arm 806 is movable during a print process. The build arm 806 can be attached to a print bed 805 via a mechanism 806b. The mechanism 806b can be designed to enable separation of the print bed 805 from the build arm 806, e.g., after printing. In an embodiments, the mechanism 806b can be a threaded stud or other fastening mechanism. The build arm 806 can include a fluid transport mechanism 849 for releasing fluids from an interior of the hollow section 845 into an interior chamber of the container 803.

In some embodiments, a predefined volume of cleaning fluid (e.g., alcohol) can be stored within the vessel 800 and/or within the build arm 806 (e.g., within the hollow section 845 of the build arm 806). For example, as depicted in FIGS. 14A and 14B, the build arm 806 can be rotated after the curing process completes, allowing a cleaning fluid stored within the hollow section 845 to be released into (e.g., pour into) the surrounding vessel chamber. The fluid transport mechanism 849 can include a valve or other controlled opening that can be used control delivery of the cleaning fluid. Once released, the amount of cleaning fluid can be sufficient for submerging or partially submerging the printed object within the fluid, e.g., for a predetermined period of time. Optionally, the vessel 800 can allow air to pass through the build arm 806 such that the cleaning fluid can be bubbled during or after the print process, or the cleaning fluid can be carbonated prior to installation, e.g., at a time of manufacture, and air allowed to escape through the build arm 806.

In some embodiments, a fluid other than a cleaning fluid can be stored within the vessel 800 and/or build arm 806. For example, a second type of photopolymer (e.g., a different color of photopolymer) can be stored within the hollow section 845 and be released at one or more time periods during a print process to adapt a color of the printed object.

The base 804 can be implemented as a membrane that is stretched taut across a bottom of the container 803. The membrane can be a light transmissive material that can be separated from a print or cured photopolymer. The material, even when stretched across the bottom of the vessel 800, can be configured to be transmissive to light or optically clear so light passing through is generally not distorted. A suitable material for the membrane can be, for example, a fluoropolymer such as FEP, which is relatively durable when compared to polydimethylsiloxane (PDMS) or other materials that are used in some printing processes and devices. While FEP is provided as a specific example of a suitable material, it can be appreciated that any material having the functionality described above can be used for the membrane.

As the membrane is optically clear, the photopolymer can be exposed to light from the bottom side, e.g., light can enter through a bottom side of the container 803 by passing through the membrane and contacting a portion of the photopolymer. The photopolymer that is disposed between an upper side of the membrane and a bottom surface of the print bed 805 can be exposed to the light transmitted through the membrane and become hardened (e.g., cured) due to photo-initiators in the photopolymer's chemical composition. This flat cured area can represent a 2D slice or layer of a printed 3D object. For example, with reference to UV or other spectrum light, the photopolymer can become polymerized as it is irradiated by electromagnetic radiation with a wavelength within the UV or other relevant spectrum.

Optionally, the upper side of the membrane (e.g., side of the membrane that is in contact with the photopolymer) can be coated with a hydrophobic material and or a high density optically clear fluid, e.g., a fluid having a density greater than that of the photopolymer. This material can reduce the contact forces between the cured photopolymer and the membrane, which in turn reduces the separation force required to separate the two. By doing so, this coating can increase the overall print speed, e.g., since the print bed 805 may not need to be lifted as high to separate the cured photopolymer from the membrane. Optionally, a fluid can be placed in the resin container 803 such that the fluid is disposed between the photopolymer and the membrane surface. For example, a fluid can be selected having a density greater than that of the photopolymer such that it sinks below the photopolymer to be positioned between the photopolymer and the membrane surface, or another suitable method for positioning a fluid between the photopolymer and the membrane surface can be used. In an embodiment where the membrane is held taut, an over moulding process can be used to hold the membrane in place. During the additive manufacturing process, as each layer of photopolymer is cured, the cured photopolymer can become attached to (e.g., suctioned onto) the membrane due to a shrinkage of the photopolymer during curing, which can create an area of low pressure beneath a cured area and, to a lesser extent, van der Waals forces. After the photopolymer has cured, the print bed 805 can be lifted away from the membrane to separate the cured photopolymer from the membrane. For example, the print bed 805 can lift a sufficient distance so that the tension in the membrane is enough to overcome the attachment force (e.g., suction or vacuum force), e.g., by peeling. In embodiments, the membrane can be a flexible material (e.g., a material having a relatively high elastic modulus), such that the membrane can peel away from the cured photopolymer, and no forces need to be applied directly to the cured photopolymer to remove it from the membrane. Such can lead to a separation between the cured photopolymer and the membrane that is less likely to cause damage to the cured photopolymer or membrane.

In embodiments described herein, the distance required by the print bed 805 to separate the cured photopolymer from the membrane is measurable and quantifiable. For example, a time variable or estimate of time can be determined based on a surface area of the printed layer. The time variable can depend on a number of factors, including, for example, a surface area of each layer, which can change as the print progresses (e.g., based on a specific mask being used). As the surface area decreases, the distance that the bed 805 has to lift in order to separate from the membrane can decrease. Accordingly, with a smaller printed layer, the lift distance can be reduced and time can be saved on particular layers during a print process. Such variability may not be accounted for in existing systems. In particular, while it can be difficult to control the print bed lift and drop distance dynamically per layer from a software perspective, e.g., where a change in surface area may be difficult to determine especially if not flat, the physical media of systems and methods described herein can have a predefined surface area per layer and carry predefined settings. Thus, systems and methods described herein can reduce the risk that a particular layer of photopolymer would not separate correctly, e.g., due to an insufficient lift distance, while allowing settings for lift distance and other variables to be predefined for each print layer, thereby enabling improvements in print speed for any given surface area covered by a print layer.

As the area directly between the cured and printed layer and the membrane becomes an area of low pressure, the outline of the cured layer can be viewed as a threshold region. This threshold region is where the attachment (e.g., suction) between the cured layer and membrane can begin to separate (e.g., break). Stated differently, the separation between the cured photopolymer and the membrane can begin at an edge of the layer and work inwards as the print bed 805 is lifted and the cured layer of photopolymer is peeled away from the membrane.

Another factor that can affect print cycle time is the tension across a face of the membrane. For example, the membrane can be configured to have a certain tautness such that it remains flat when the weight of the photopolymer is upon it but can flex under sufficient force without being damaged. The specific arrangement of the membrane, including the tautness of the membrane, can depend on the type, sheet size, thickness, and/or material of the membrane. While a membrane can be placed in tension according to methods described herein, it is appreciated that other methods and materials can be used.

Vessels described herein (e.g., vessel 800) can be manufactured in a number of ways and or via a combination of methods. For example, components such as a container of the vessel can be blow moulded and other components such as the build arm can be injection moulded and installed. The membrane can be attached by over moulding or by other processes, e.g., installing a sleeve 870 (FIG. 13B) which can, for example, be made of silicon. The sleeve 870 can protrude around and/or extend along a portion of the side wall(s) of the container 803, and be used to hold the membrane in place. The sleeve 870 can be held in place with a bonding agent or any appreciable material or mechanism capable of adhering the sleeve 870 to the housing of the vessel 800.

In some embodiments, one or more components of vessels described herein (e.g., vessel 800) can be pre-installed, e.g., installed at a time of manufacturing and prior to use of the vessel. For example, the photopolymer can be pre-installed in the vessel, which can reduce a risk of exposure of a user to the liquid photopolymer, which can have properties that present issues when in contact with skin. Additionally or alternatively, the cleaning fluid can be pre-installed in the vessel. Typically, printed objects formed using 3D printing processes are cleaned prior to being touched by a user. Having the cleaning fluid in the vessel can reduce user contact with uncured photopolymer and/or ensure that the printed part is cleaned with a sufficient amount of cleaning fluid, reducing the need for a user to have knowledge of how much cleaning fluid to use. Having the cleaning fluid pre-installed also increases the usability of systems and devices described herein in environments where cleaning fluid may not be readily available. Additionally or alternatively, the build plate can be pre-installed in the vessel. In some embodiments, the build plate can incorporate mechanisms, such as, for example, NFC tags, which can be used to carry data associated with the print. When a photopolymer and the build plate are pre-installed or provided together within a vessel, the print bed can also be made from a material suitable for adhesion of a given photopolymer.

In some embodiments, vessels described herein (e.g., vessel 800) can be used as a protective enclosure, e.g., for displaying a finished print.

In some embodiments, vessels described herein (e.g., vessel 800) or certain components of such vessels can be configured as disposable components, which can reduce user maintenance of those components between prints.

Figure 15:
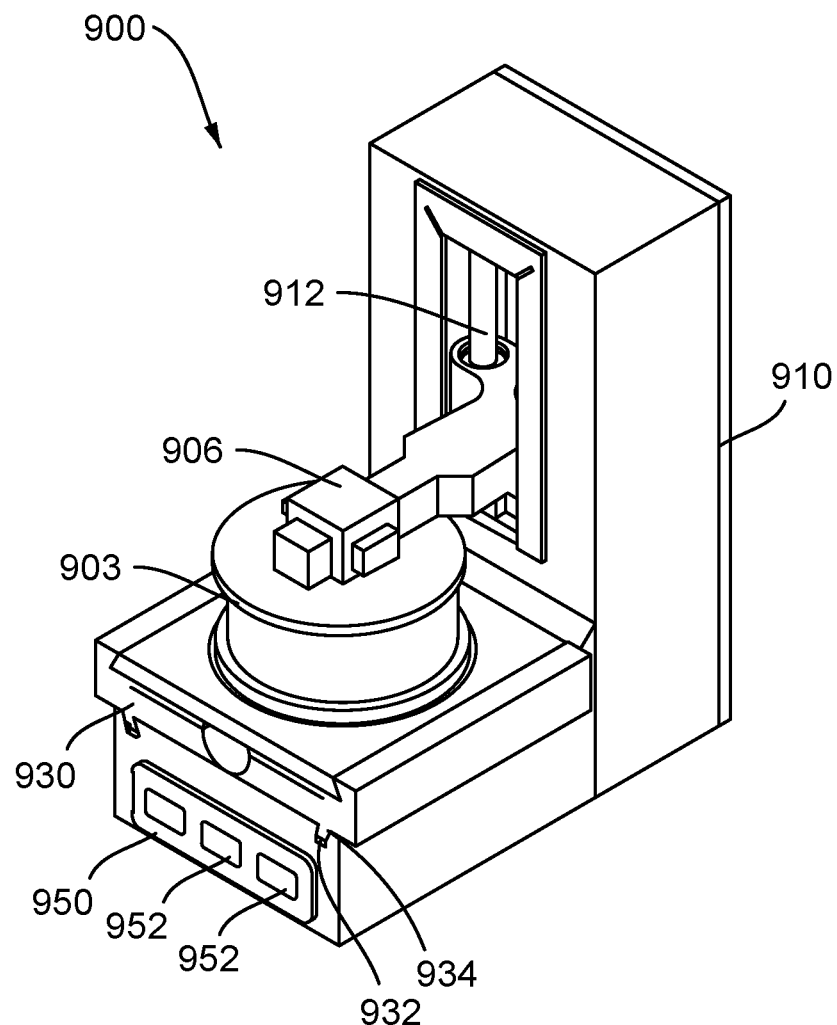
FIG. 15 is a perspective view of an additive manufacturing device, according to embodiments disclosed herein.
Figure 16:
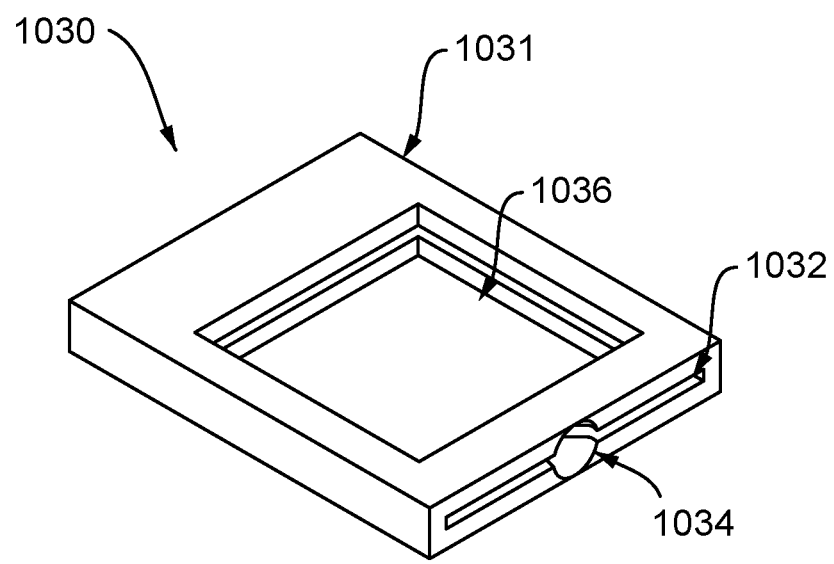
FIG. 16 is a perspective view of a mask carrier of an additive manufacturing device, according to embodiments disclosed herein.

In some embodiments, additive manufacturing devices described herein can be used with a mask carrier containing a single mask or a SPMSD, e.g., as shown in FIGS. 15-16, as an addition to or as an alternative to a PSMD containing a plurality or reel of masks. As depicted in FIG. 15, an example additive manufacturing device 900 can include a mask carrier implemented as a SPMSD 930. The manufacturing device 900 can include components that are structurally and/or functionally similar to other manufacturing devices described herein (e.g., manufacturing devices 100, 200, 300, 400). The manufacturing device 900 can include a support structure or housing 910, a linear guide 912, a build arm 906, a vessel 903, and a user interface 950.

The vessel 903 can contain a photopolymer and a print bed (not depicted) upon which layers of an object can be printed. The SPMSD 930 can include a housing that supports an individual mask. That individual mask can be used to cure one or more layers of an object on the print bed. The SPMSD 930 can be inserted into the manufacturing device 900, e.g., along a slot. Once inserted into the slot, the SPMSD 930 can align with a light (not depicted) and a bottom surface (e.g., a transparent base) of the vessel 903. To facilitate with this alignment, the slot and the SPMSD 930 can include one or more mating features 932, 934 that mate with one another to set the proper positioning of the SPMSD 930 in the manufacturing device 900.

The user interface 950 can include a number of input elements 952 (e.g., buttons) that allow a user to input a function that the user desires the manufacturing device to perform. For example, the user interface 950 can include a "Print" button that, when pressed by a user, initiates a printing process whereby an object is printed using the manufacturing device 900. As another example, the user interface 950 can include a "Clean" or "Wash" button that, when pressed by a user, initiates a cleaning process whereby a cleaning agent is released into the vessel 903 and a printed object can be submerged in for a period of time. The user interface 950 can also include other input elements for other operations, e.g., a reset button for resetting one or more components of the device to various start positions, a keypad or touchscreen for inputting various parameters of a print, etc.

In some embodiments, the manufacturing device 900 can be programmed to receive a mask and print a certain number of layers of an object before pausing the print operation and waiting for a user (or another device) to exchange the mask with a different mask. Similar to other masks described herein, the masks used with the manufacturing device 900 can be configured to control where light is transmitted and thereby define the layers of an object being printed. In some embodiments, a mask (or a user) can provide information regarding a number of layers to print with that mask before exchanging it with a different mask. In some embodiments, the user can select the number of layers to print with any given mask via an input device (e.g., user interface 950), which can include a rotary switch, a touch screen, or other similar apparatus. The input device can be operatively coupled to the manufacturing device 900 and/or integrated into the manufacturing device 900.

In some embodiments, a mask can be an image printed (e.g., in black and white) on a material that is light transmissive, such as paper or certain plastics. In other embodiments, a mask can include cut-outs or etching in a non-transmissive material, such as a cellulose material (e.g., wood) or non-transparent plastic or polymer sheet. FIG. 17 depicts several examples of masks 1101, 1201, 1301, 1401, including masks formed of different substrates (e.g., wood, plastic, metal, etc.). Mask 1101 is a formed of a transmissive material (e.g., a paper or plastic) with non-transmissive ink printed on the material to form a pattern 1111. Mask 1201 is formed of a non-transmissive material (e.g., a paper or plastic) with cut-outs that form a pattern 1211. Mask 1301 is formed of a transmissive material (e.g., a plastic or other polymer) with a region that is etched or covered with an additional layer of material for producing a pattern 1311. And mask 1401 is formed of a non-transmissive cellulose material that includes a cut-out that forms a pattern 1411. Each of these masks 1101, 1201, 1301, 1401 can be stand-alone masks that can be used with or without a SPMSD (e.g., SPMSD 930) in a printing process with manufacturing devices described herein. For example, the masks 1101, 1201, 1301, 1401 can be placed individually in a space between a light source and a vessel to alter the pattern of light that passes through from the light source to the vessel to cure the photopolymer within the vessel.

FIG. 16 depicts an example of a SPMSD 1030, including a protective housing 1031, a window 1036, a slot or opening 1032 for receiving a mask, and a notch 1034 for facilitating removal of a mask from the slot 1032. The SPMSD 1030 can be used with the manufacturing devices described herein (e.g., manufacturing device 900) to print a 3D object. The window 1036 can be designed to expose the mask such that a portion of light can travel through the mask and into a vessel containing a photopolymer. The notch 1034 can facilitate exchange of masks, e.g., during or between print processes.

Figure 18:
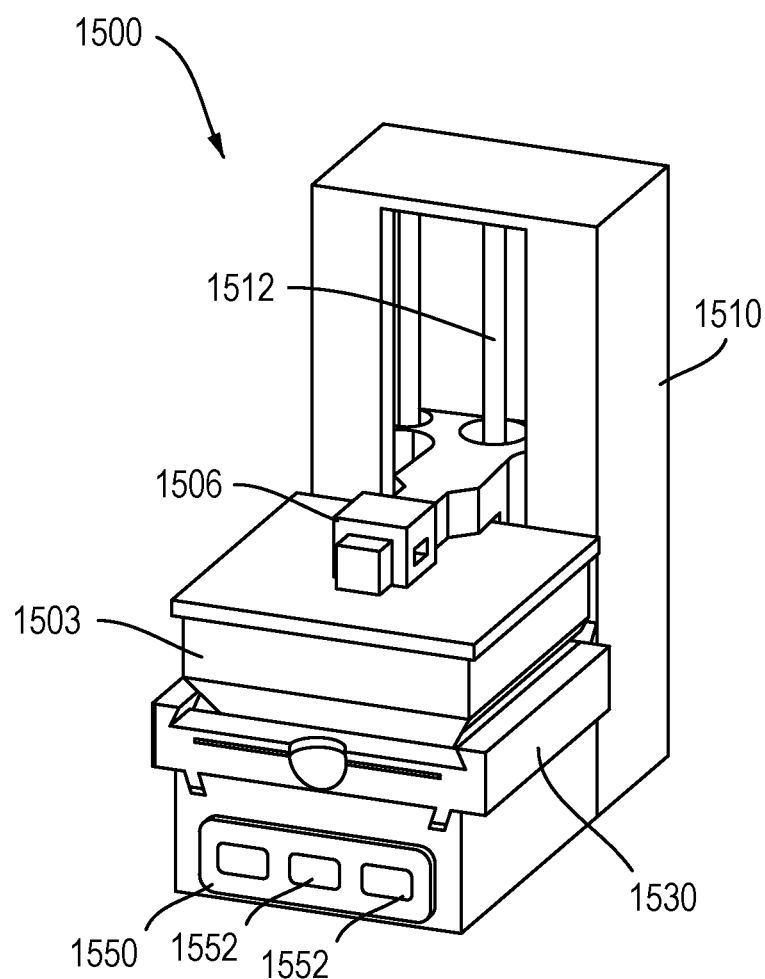
FIG. 18 is a perspective view of an additive manufacturing device, according to embodiments disclosed herein.

FIG. 18 depicts an example manufacturing device 1500, according to embodiments described herein. The manufacturing device 1500 can include components that are structurally and/or functionally similar to those of other manufacturing devices described herein (e.g., manufacturing devices 100, 200, 300, 400). The manufacturing device 1500 can include a support structure or housing 1510, a linear guide 1512, a build arm 1506, a vessel 1503, a mask carrier implemented as a SPMSD 1530, and a user interface 1550 including input elements 1552. Unlike the vessel 903 of the manufacturing device 900 (see FIG. 15), which has a circular cross-sectional shape, the vessel 1503 of the manufacturing device 1500 can have a square or rectangular cross-sectional shape. The different shapes of the vessels 903, 1503 can be used to accommodate different sized and/or shaped objects being printed.

Figure 19:
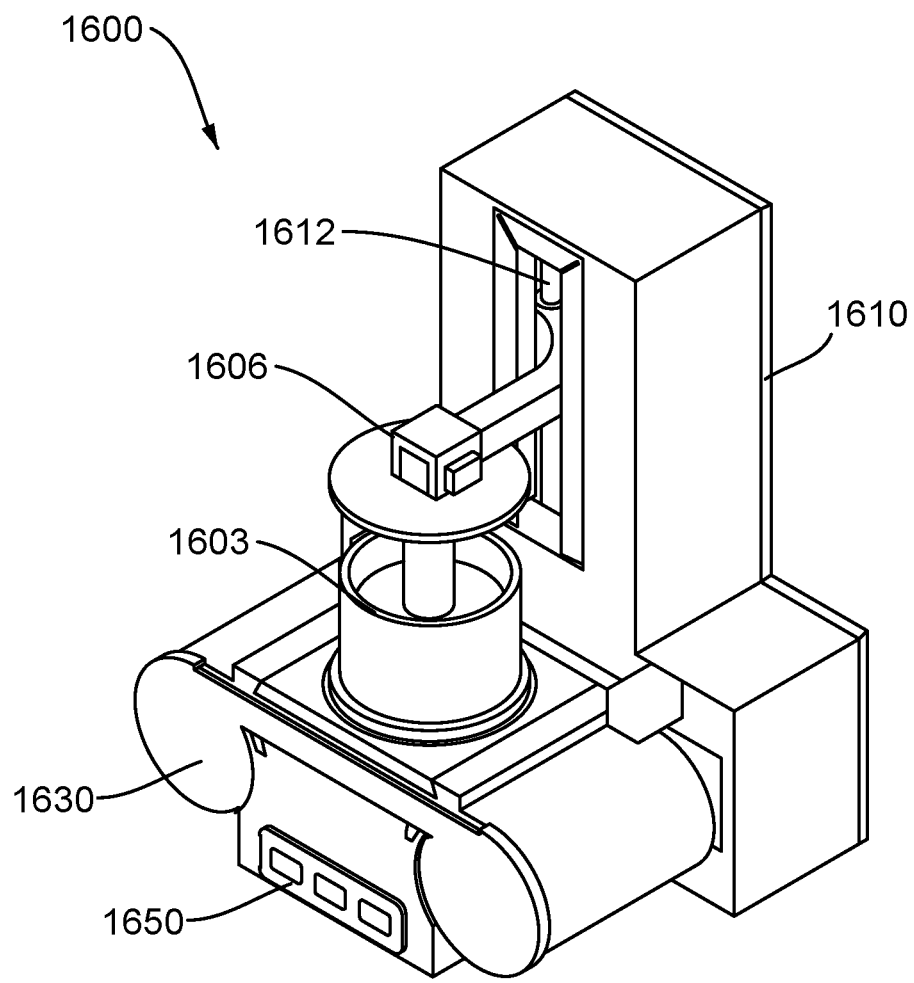
FIG. 19 is a perspective view of an additive manufacturing device, according to embodiments disclosed herein.

FIG. 19 depicts an example manufacturing device 1600, according to embodiments described herein. The manufacturing device 1600 can include components that are structurally and/or functionally similar to those of other manufacturing devices described herein (e.g., manufacturing devices 100, 200, 300, 400). The manufacturing device 1600 can include a support structure or housing 1610, a linear guide 1612, a build arm 1606, a vessel 1603, a mask carrier implemented as a PMSD 1630 (e.g., including a reel or plurality of masks), and a user interface 1650. The vessel 1603 of the manufacturing device 1600 can have a circular cross-sectional shape.

Figure 20:
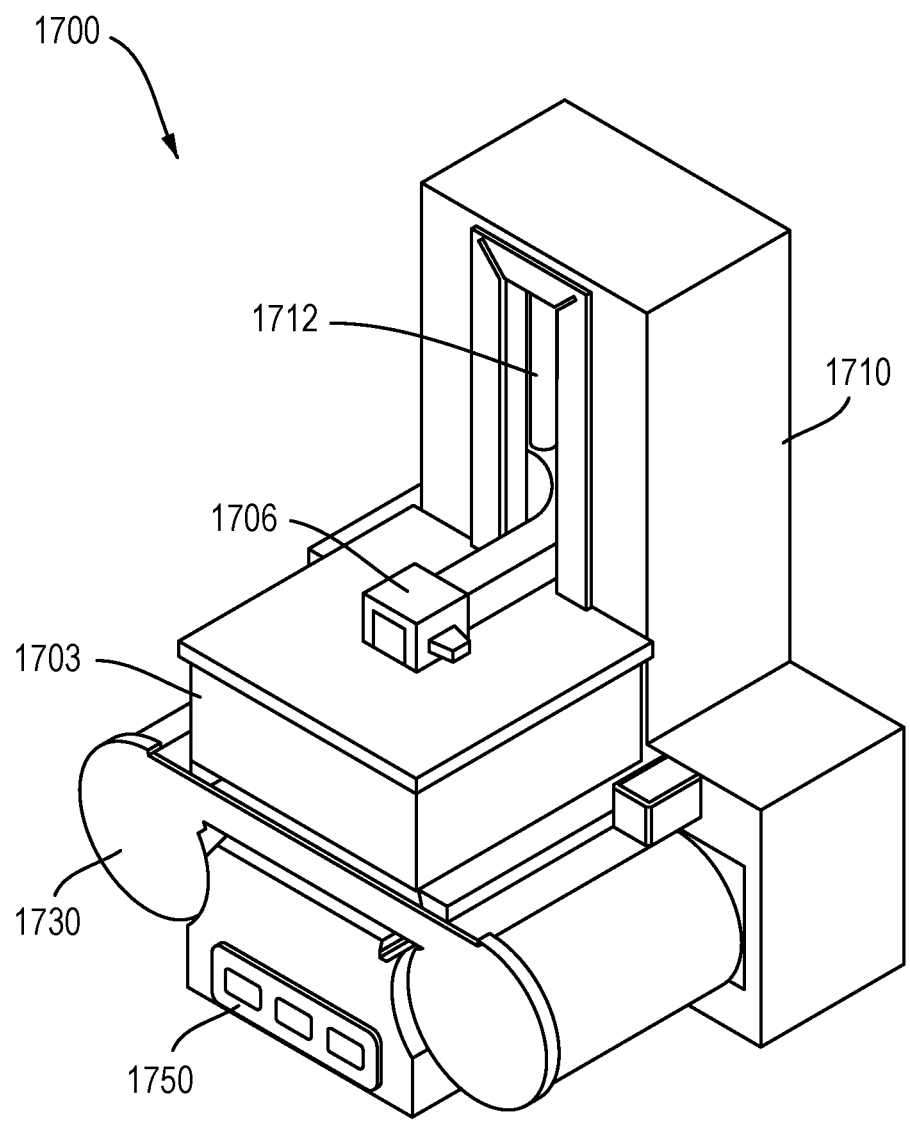
FIG. 20 is a perspective view of an additive manufacturing device, according to embodiments disclosed herein.

FIG. 20 depicts an example manufacturing device 1700, according to embodiments described herein. The manufacturing device 1700 can include components that are structurally and/or functionally similar to those of other manufacturing devices described herein (e.g., manufacturing devices 100, 200, 300, 400). The manufacturing device 1700 can include a support structure or housing 1710, a linear guide 1712, a build arm 1706, a vessel 1703, a mask carrier implemented as a PMSD 1730 (e.g., including a reel or plurality of masks), and a user interface 1750. The vessel 1703 of the manufacturing device 1700 can have a square or rectangular cross-sectional shape.

Figure 21A:
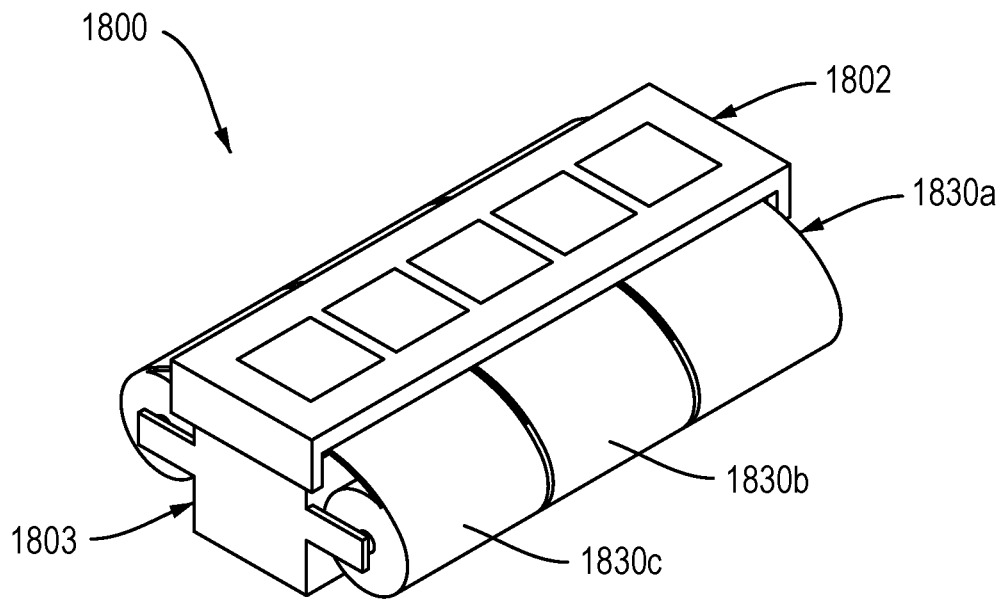
FIG. 21A is a perspective view of a mask carrier of an additive manufacturing device for use in industrial settings, according to embodiments disclosed herein.
Figure 21B:
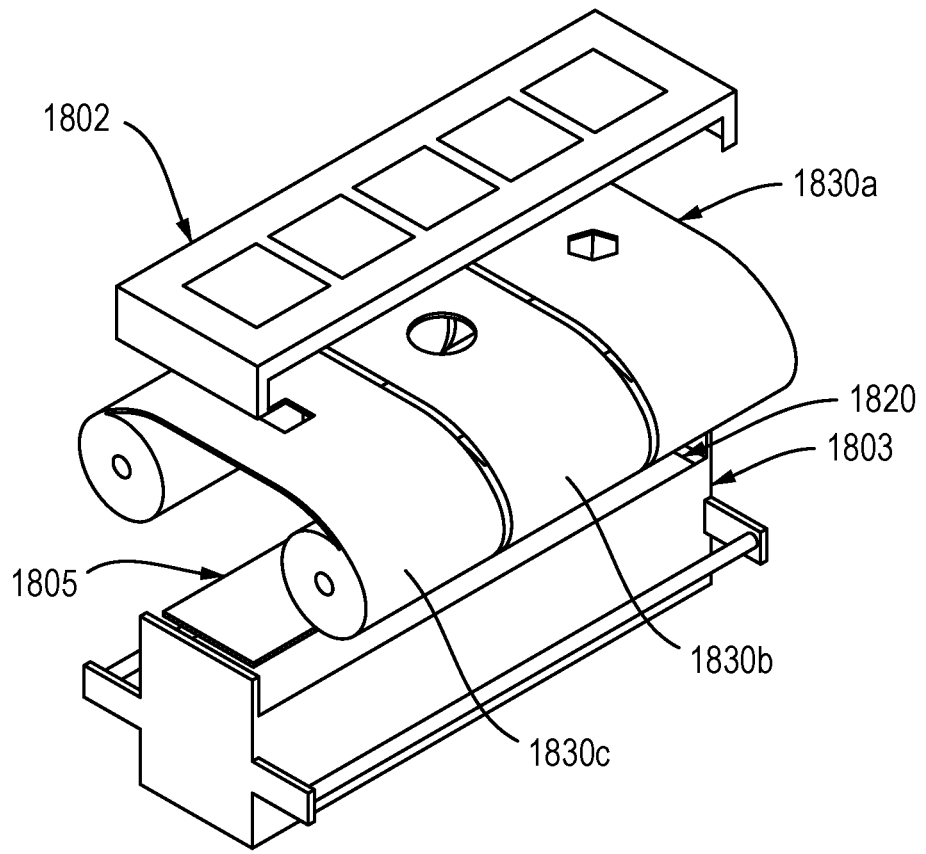
FIG. 21B is an exploded view of the additive manufacturing device depicted in FIG. 21A.

FIGS. 21A and 21B depict an example additive manufacturing device 1800, according to embodiments herein. The manufacturing device 1800 can be scaled for industrial use, e.g., by including multiple reels of masks 1830a, 1830b, 1830c (e.g., sets of masks) and/or larger reels or masks. The manufacturing device 1800 can include components that are structurally and/or functionally similar to those of other manufacturing devices described herein (e.g., manufacturing devices 100, 200, 300, 400). The manufacturing device 1800 can include a vessel 1803 that can be integrated with or coupled to one or more axels upon which portions of the reels of masks 1830a, 1830b, 1830c can be wound and stored when not in use. The vessel 1803 can contain a liquid photopolymer 1820. The manufacturing device 1800 can include a build plate 1805 that is disposable within a chamber of the vessel 1803. The manufacturing device can include one or more light source(s) 1802. The manufacturing device 1800 can be scaled for industrial use while maintaining resolution comparable to other manufacturing devices described herein.

Figure 22:
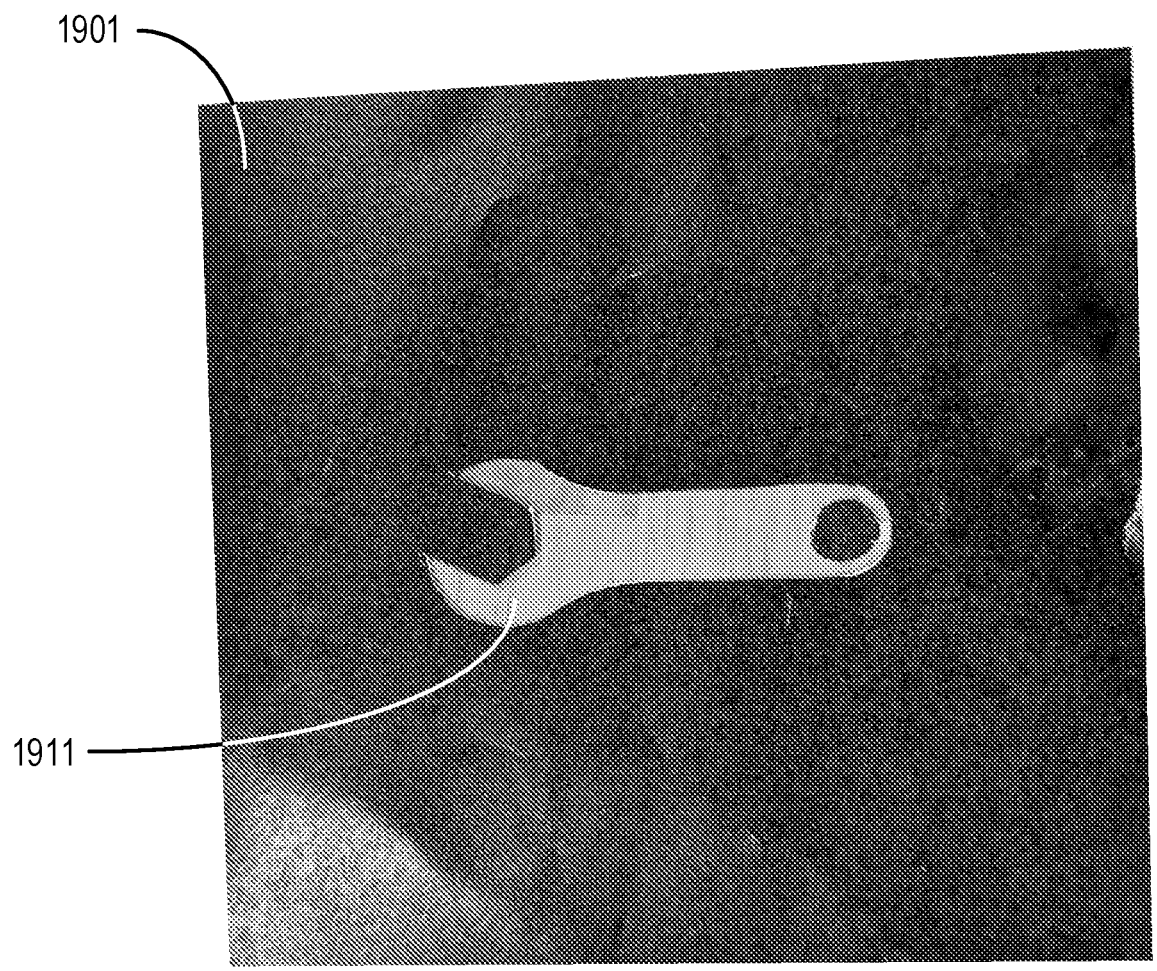
FIG. 22 is a top view of a mask for use with an additive manufacturing device, according to embodiments disclosed herein.
Figure 23B:
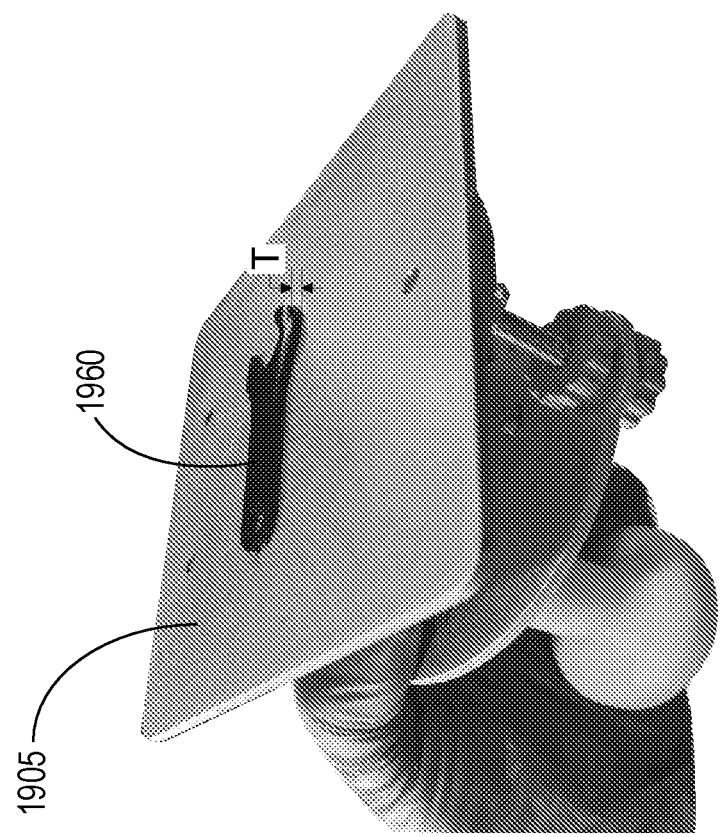
FIGS. 23A-B are images of an 3D object printed on a print bed using an additive manufacturing device, according to embodiments disclosed herein.
Figure 23A:
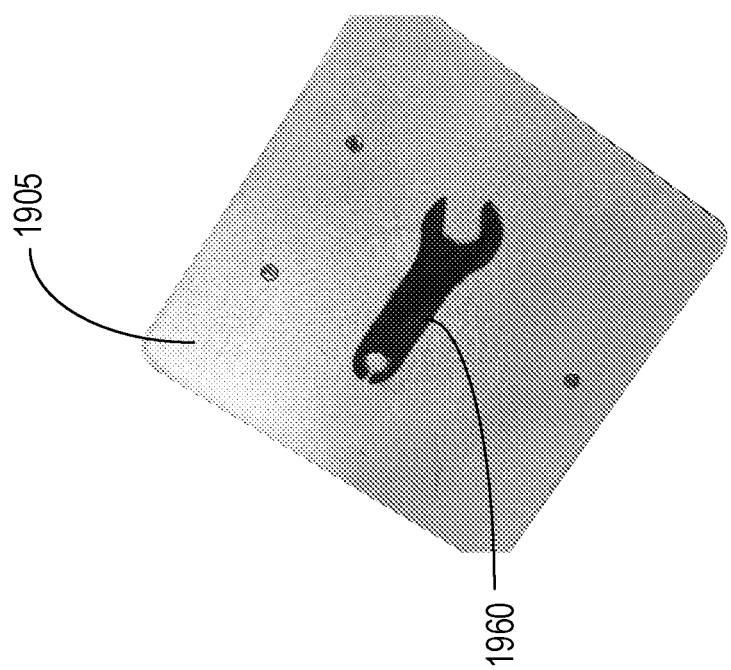

FIG. 22 is a top view of an example mask 1901 including a cut-out 1911. The mask 1901 can be formed of a non-transmissive material, such as, for example, a black paper. The cut-out 1911 can be the portion of the mask 1901 that enable transmission of light and, together with the non-transmissive surroundings, defines a pattern for printing a 3D object. FIGS. 23A and 23B are images of a print bed 1905 with an object 1960 printed using the mask 1901 depicted in FIG. 22. As depicted, the object 1960 can have a shape that corresponds to the cut-out 1911, and a height that is the combined height of a predetermined number of layers of cured polymer printed using the mask 1901.

Figure 24:
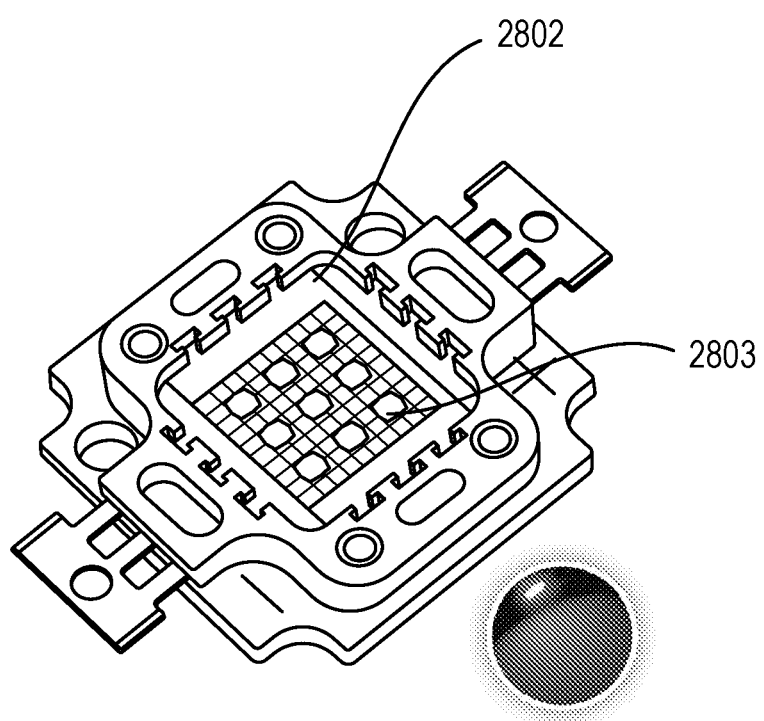
FIG. 24 is a perspective view of a light source of an additive manufacturing device, according to embodiments disclosed herein.

FIG. 24 depicts an example light source 2802 that can be used with additive manufacturing devices, as described herein. The light source 2802 can be a LED light source that uses about 10 Watts and can be chosen to emit light at a wavelength of between about 355 nm and about 395 nm. The light source 2802 can be configured to cure a 0.05 mm thick layer of photopolymer with an area equal to a top surface area 2803 of the light source 2802 in about 5 milliseconds, when the light source 2802 is less than 10 mm from the photopolymer and the pathway is generally light transmissive (e.g., greater than 60% of relevant wavelength transmission). In an embodiment, this top surface area 2803 can be approximately 10 mm by 10 mm.

Table 2 provides the times taken for an LED light source, such as the LED light source described above with reference to FIG. 24, to cure a 10 by 10 by 0.05 mm volume of photopolymer (i.e., a layer of photopolymer with a height of about 0.05 mm and later dimensions of about 10 by 10 mm), with different types of masks and at a distance of about 10 mm from the photopolymer.

TABLE 2

| Pattern method | Cure time |
| --- | --- |
| Open physical mask(cut-out mask) | 5 milliseconds |
| Bleached Paper physical mask | 500 milliseconds |
| Transparent polymer physical mask | 5-10 milliseconds |
| Digital LCD | 2 seconds |

With thinner paper substrates, cure time also decreased. Polymer substrate masks also performed similarly to open masks with cure times of between 5-10 milliseconds.

While the examples above are described with reference to a LED light source, systems and devices described herein can also be used with a liquid crystal display (LCD) pattern and light source that can be used to form a digital image. But when the LED systems and LCD systems are compared, the cure rate of a LED light source with a physical mask is significantly faster than a LCD light source that forms a digital image at equal distances. This can generally result from a LCD being designed to block the majority of the relevant wavelengths of light required to cure common photopolymers (e.g., wavelengths that initiate within the UV spectrum). For example, with a 10 by 10 by 0.05 mm volume of photopolymer, where a LED light source and an open physical mask would take 5 milliseconds, or where a LED light source and a paper substrate mask would take 500 milliseconds, a LCD system (specifically, one with the LCD 2902 depicted in FIG. 52) took approximately 2 seconds or more. Accordingly, a LCD system takes approximately 400 times longer than a LED light with an open mask and about 4 time longer than a LED light with a paper substrate mask to cure the same amount of photopolymer. LCDs are also more susceptible to thermal damage than a physical mask, and therefore the power and/or the distance of the light source in LCD systems are limited by the characteristics of the LCD when compared to a physical mask. As such, usage of an LCD pattern to cure a photopolymer under normal usage conditions may take longer, e.g., between about 6 to about 35 seconds.

While LCD systems generally take longer to cure a photopolymer, systems and devices described herein can be used with such digital patterns, e.g., in addition to or as an alternative to physical masking, to further expand the usage adaptability of systems and devices described herein. For example, as a LCD is digital, it can display patterns when connected to suitable electronics. It therefore may be desirable to use an LCD pattern device within the printer for the purposes of testing or prototyping physical masks before committing to producing such physical masks for long term usage and higher performance. For example, the LCD can be placed within an additive manufacturing device alongside a LED light source to test one or more patterns before preparing one or more physical masks. To reduce variability between LCD and LED performance, and for the purposes of prototyping, the LCD light source can be designed to have equal surface area as an LED light source; however, such is not required as a LCD can be programmed to display variations in size of an image. In some embodiments, LCD systems can be used to perform printing of portions of an object that have not been committed to one or more physical masks. In operation, a LCD system includes a light source that is used to create a pattern in an optical light path that traverses through the LCD, though a transparent base of a vessel, and ultimately striking the photopolymer, with the difference from a physical masking being that the pattern displayed is controlled digitally by the LCD system.

Figure 25:
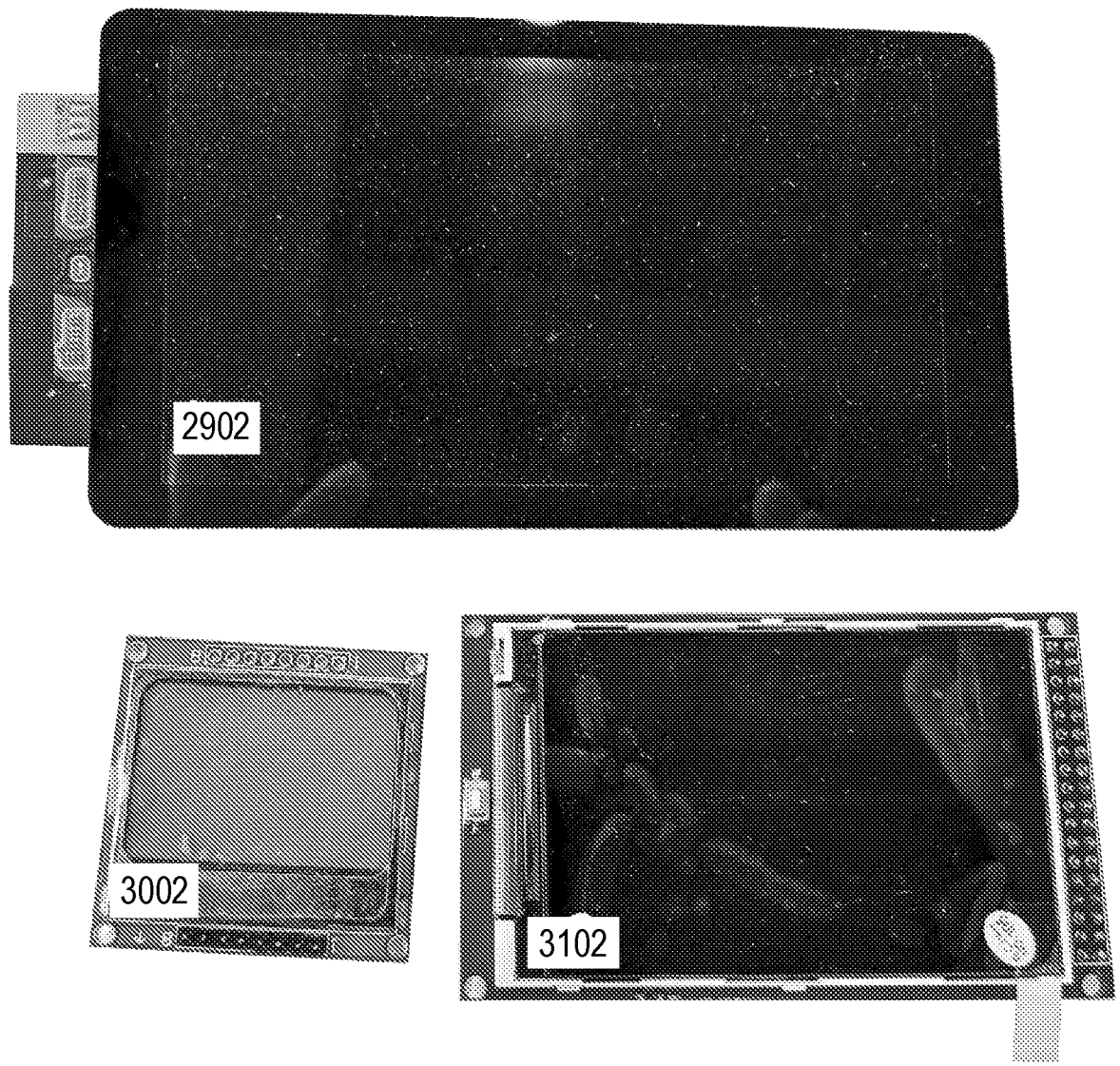
FIG. 25 is an image of different light sources that can be used with an additive manufacturing device, according to embodiments disclosed herein.

FIG. 25 depicts a number of example LCDs for use with an additive manufacturing device. Such LCDs can be positioned within a support structure of an additive manufacturing device and/or carried in a mask carrier. LCDs 2902 and 3102 are examples of thin-film transistor liquid crystal arrays and LCD 3002 is a basic graphic liquid crystal display, which can be less costly than the LCDs 2902 and 3102 but also have lower resolution.

Figure 26:
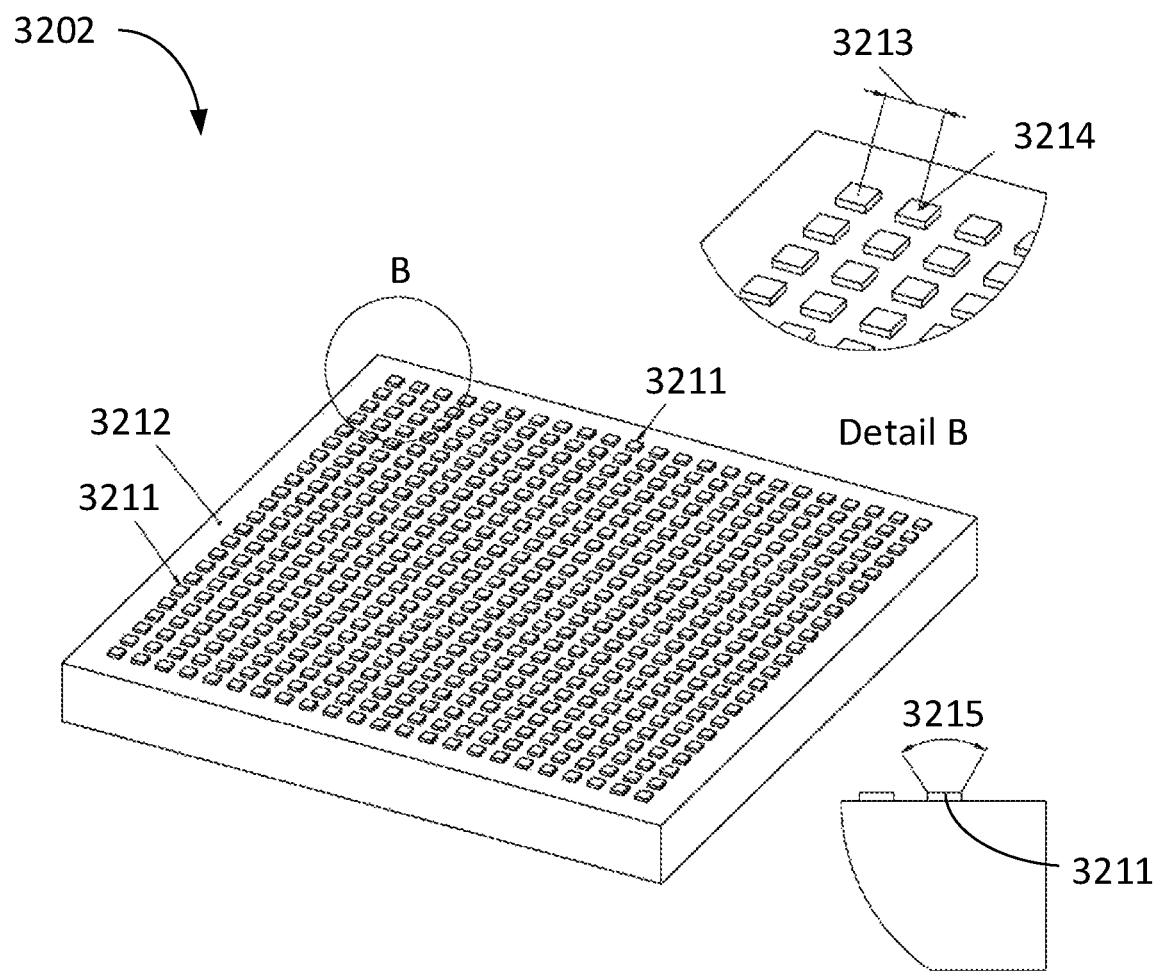
FIG. 26 includes a perspective view and more detailed views of a light source of an additive manufacturing device, according to embodiments disclosed herein.

FIG. 26 depicts an example light source 3202 implemented as an array of LEDs 3211. The light source 3202 can include LEDs 3211 that cover a surface area sized for curing a desired area of photopolymer. The LEDs 3211 can be disposed on a top surface of a housing 3212. Detail B as depicted in FIG. 26 provides a closer view of a region B of the light source 3202, showing a distance 3213 (e.g., pitch) between the centers 3214 of adjacent LEDs 3211. FIG. 26 also depicts a cross-sectional view of a LED 3211, showing an angle 3215 of emission of light from the LED 3211.

In some embodiments, the array of LEDs 3211 can be a configurable array of LEDs, which can be used with or without physical masking (e.g., such as any of the physical masks described herein). For example, the masking of light can be controlled digitally, e.g., by selectively emitting light from LEDs at predefined positions in the array without using a physical mask, or by using a physical mask that blocks light transmission from one or more LEDs of the array of LEDs. Each LED 3211 can be configured to emit a wavelength of light that is suitable for curing a photopolymer. For example, for many type of photopolymers, the wavelength of light that can be used to cure the photopolymers can be between about 355 nm and about 395 nm, as these wavelengths are the ones that correspond to the initiation wavelengths of the photo-initiators of those photopolymers.

In some embodiments, the array of LEDs 3211 can include micro-lenses to control light emission, diffusers to flatten the light intensity across the curing plane, optical fibers, fluids (e.g., water), and/or other optical adjustment mechanisms.

The LEDs can have a pitch 3213 noted along one or more axes, which represents to distance between the centers of adjacent LEDs. The resolution of the array of LEDs 3211 can be based on the pitch 3212 and the number of LEDs in the array when the LEDs 3213 are not used with a physical mask. For example, with an array of 64-by-64 LEDs covering a surface area of approximately 21.55 by 21.55 cm (i.e., a square surface area with a 12 inch diagonal), and having equal pitch 3213 in both X and Y axes that is approximately 3.3676 mm, the resolution of the array can be approximately 7.54 dots per inch. As each LED 3211 can be addressed individually, an image or pattern can be displayed by the source for the purposes of curing a photopolymer without additional masking (e.g., without a physical mask or with a clear mask that does not have any light blocking pattern). In some embodiments, the resolution of such a system can be lower than one that uses a physical mask. The 64-by-64 array can have 4,096 positions that can be illuminated. When used with static manufacturing devices as described herein, the array of LEDs 3211 can remove the need for a physical mask, a LCD, or other pattern masking apparatus, but can also be used in addition to such alternative masking apparatuses. Furthermore, when used without a physical mask, the light source 3202 may be moved by one-pitch distance along either axis to account for gaps in the exposure pattern when the angle of emission 3215 from the light source is approximately 90 degrees. When used with a physical mask, the light source 3202 can be configured to emit light in necessary areas (e.g., areas below transmissive portions of the mask) and not other areas, such that power consumption can be reduced.

Figure 27:
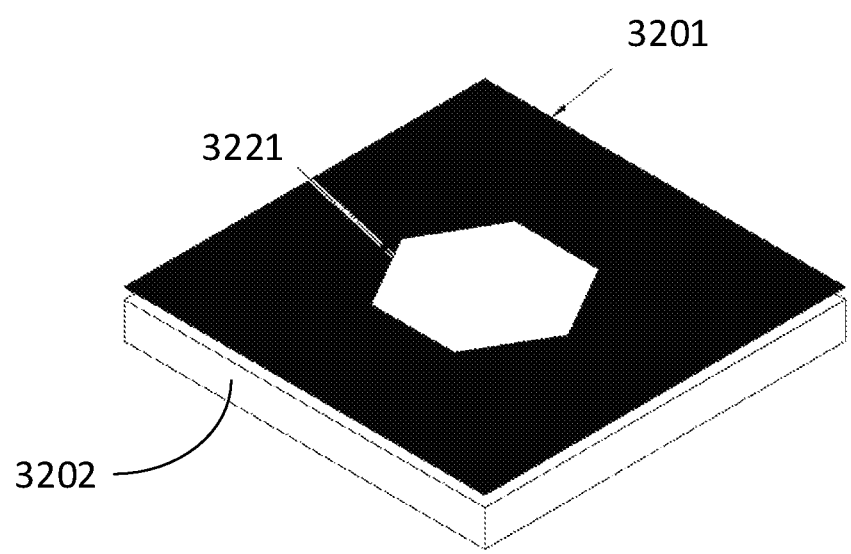
FIG. 27 is a perspective view of a mask positioned above a light source of an additive manufacturing device, according to embodiments disclosed herein.

FIG. 27 depicts the light source 3202 used with a physical mask 3201 with a pattern 3221. The physical mask 3201 can be, for example, a non-transmissive material with a negative image cut-out, or a toner-printed mask (e.g., where the pattern 3221 is produced via printing).

Figure 28A:
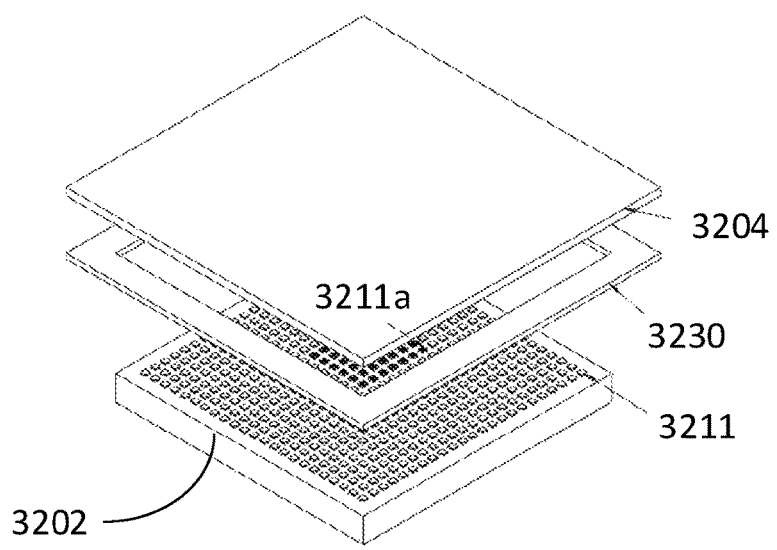
FIG. 28A is an exploded view of a light source and a frame of an additive manufacturing device, according to embodiments disclosed herein.
Figure 28B:
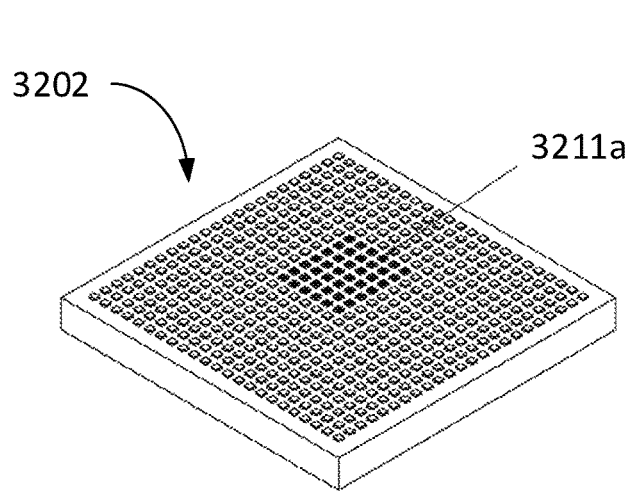
FIG. 28B is a perspective view of the light source depicted in FIG. 28A.
Figure 28C:
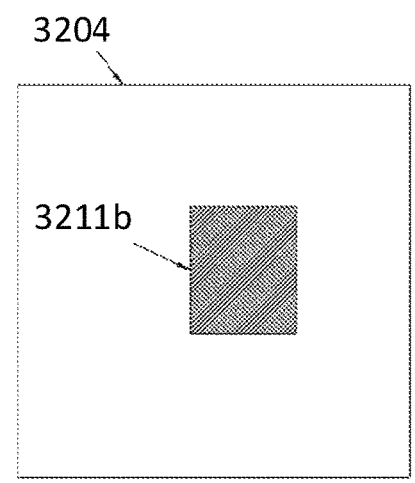
FIG. 28C is a top view of a print bed including a layer of an object printed using the light source depicted in FIG. 28A.

FIGS. 28A-28C depict the light source 3202 used with a frame 3230 (e.g., a mask carrier) containing no mask (e.g., no negative image or patterning apparatus). The array of LEDs 3211 can be activated to form an LED lighting pattern 3211a. The lighting pattern 3211a can be used to cure a photopolymer that can be printed on a print bed 3204. FIG. 28B provides a view of the lighting pattern 3211a, and FIG. 28C provides a view of the cured pattern 3211b of photopolymer located on the print bed 3204. As depicted, the resulting cure pattern is dependent on the layout of the LEDs 3211 in the array and which have been activated, rather than a pattern that is present on a physical mask. The angle of light emission 3215 and distance of the light source 3202 from the photopolymer, as well as the array dimensions, determine the eventual pattern cured when no mask is present.

Figure 32:
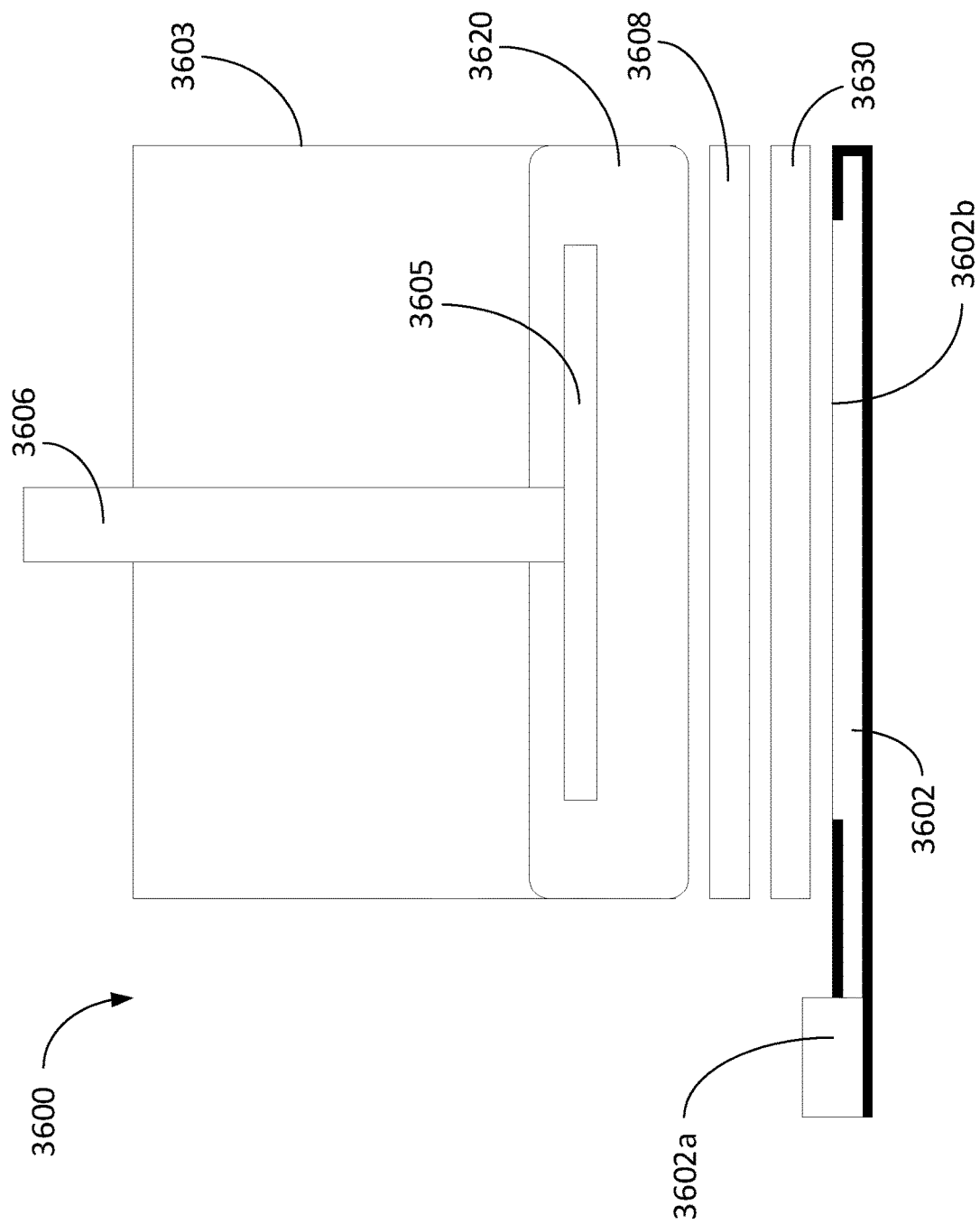
FIG. 32 schematically depicts an additive manufacturing device that can use an external light source, according to embodiments disclosed herein.

FIG. 32 depicts an example additive manufacturing device 3600 that is configured to use an external light source, such as, for example, solar energy. The additive manufacturing device 3600 can include components that are structurally and/or functionally similar to other additive manufacturing devices described herein (e.g., additive manufacturing devices 100, 200, 300, 400). The additive manufacturing device 3600 can include a build arm 3606, a print bed 3605, a vessel 3603 containing a photopolymer 3620, a mask carrier 3630, and an image adjustment mechanism 3608. The additive manufacturing device 3600 can differ from other additive manufacturing devices described herein by being configured for use with an external light source, e.g., solar energy. For example, the device 3600 can include a light guide 3602 that can receive light emitted by an external light source (e.g., solar light) at a first location 3602a and transmit that light to a second location 3602b within the device 3600 such that the light can be directed at the photopolymer 3620 to print an object. In some embodiments, the first location 3602a can be adjustable such that a user can optimally position it relative to a light source to receive light into the light guide 3602. The manufacturing device 3600 can include a light shutter that can be controlled to block the light from the light guide 3602, e.g., between curing separate layers of the photopolymer. The light shutter can be, for example, integrated into a component of the manufacturing device 3600, such as the image adjustment mechanism 3608, the light guide 3602, the mask 3630, etc. For example, the mask carrier 3630 can include a physical mask that is entirely non-transmissive, or a movable cover for covering the openings of the mask carrier 3630, that blocks light from striking the photopolymer. In some embodiments, a plurality of light guides can be used to capture light (e.g., solar light) and direct that light at the photopolymer 3620.

Figure 33:
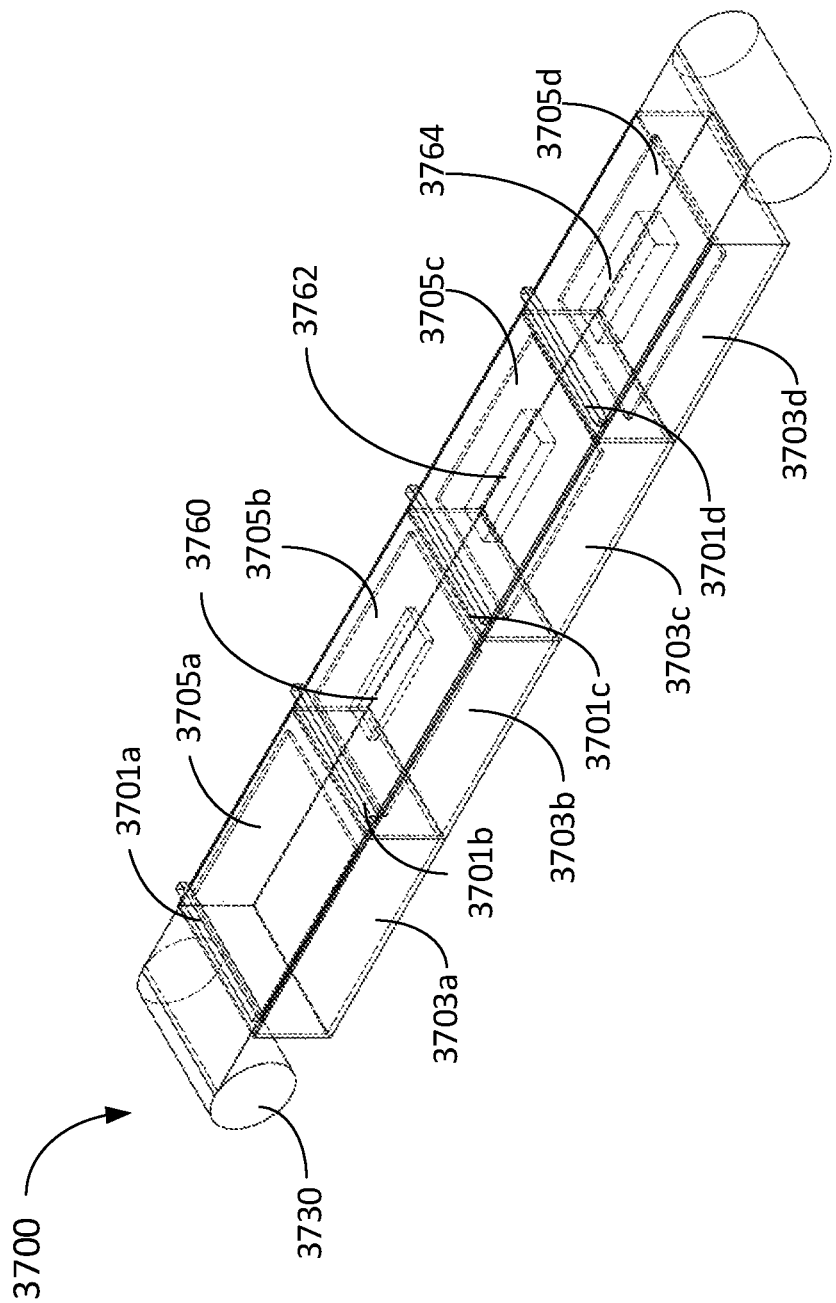
FIG. 33 is a perspective view of an additive manufacturing device for batch production, with outer housing portions shown transparently for illustrative purposes, according to embodiments disclosed herein.

FIGS. 33, 34A, and 34B depict example additive manufacturing devices for batch production, according to embodiments disclosed herein. FIG. 33 depicts an additive manufacturing device 3700 including a mash carrier implemented as a mask reel 3730, a plurality of vessels 3703a, 3703b, 3703c, 3703d containing a photopolymer, a plurality of print beds 3705a, 3705b, 3705c, 3705d, and a plurality of light sources 3701a, 3701b, 3701c, 3701d. The light sources 3701a, 3701b, 3701c, 3701d can direct light through the masks of the mask reel 3730 and into the photopolymer contained in the vessels 3703a, 3703b, 3703c, 3703d, such that one or more objects 3760, 3762, 3764 can be cured within one or more vessels 3703a, 3703b, 3703c, 3703d. The print beds 3705a, 3705b, 3705c, 3705d can move within the vessels 3703a, 3703b, 3703c, 3703d (e.g., in a direction away from a base of the vessels 3703a, 3703b, 3703c, 3703d) so as to build the objects 3760, 3762, 3764 layer-by-layer. The mask reel 3730 can store a plurality of masks that can be shared among the vessels 3703a, 3703b, 3703c, 3703d, print beds 3705a, 3705b, 3705c, 3705d, and light sources 3701a, 3701b, 3701c, 3701d. For example, a single mask can be moved along the reel 3730 to be positioned adjacent to any one of vessels 3703a, 3703b, 3703c, 3703d such that the mask can be used to control the pattern of light that is printed into a particular vessel 3703a, 3703b, 3703c, 3703d. In an embodiment, the shared mask reel 3730 can have dimensions greater than about 1 meter by 0.2 meters. As depicted, the objects 3760, 3762, 3764 can each be at a different stage of printing (e.g., at different print heights). In some embodiments, light sources 3701a, 3701b, 3701c, 3701d can be reduced to a single light source that traverses above each mask individually and/or a single light source that covers an entire curable surface area of each vessel 3703a, 3703b, 3703c, 3703d.

FIG. 34A depicts a cross-sectional view of the additive manufacturing device 3700. As depicted in FIG. 34A, the mask reel 3730 can be advanced along a direction 3750 to position the masks in position relative to the vessels 3703a, 3703b, 3703c, 3703d. FIG. 34B depicts an alternative manufacturing device 3700', which includes similar components as those of manufacturing device 3700, but with light sources 3701a', 3701b', 3701c', 3701d' spanning a surface area equal to that of the print beds 3705a, 3705b, 3705c, 3705d.

The additive manufacturing devices 3700, 3700' can enable batch production of items via sharing of a single physical mask reel 3730 between multiple 3D prints that are being printed simultaneously. The shared mask reel 3730 can span across multiple vessels 3703a, 3703b, 3703c, 3703d. In the embodiments depicted, the light sources 3701a, 3701b, 3701c, 3701d, 3701a', 3701b', 3701c', 3701d' can be located above the masks. Therefore, during printing, the print beds 3705a, 3705b, 3705c, 3705d to enable printing of successive layers of objects. The light sources 3701a, 3701b, 3701c, 3701d, 3701a', 3701b', 3701c', 3701d can be similar to other light sources described herein. For example, the light sources can be configured to emit UV light between 355 nm and 395 nm, which is an effective wavelength for curing most photopolymers and can minimize the size of the light source required to cure the photopolymer. Certain internal components of the additive manufacturing device 3700, 3700' have been omitted in FIGS. 33, 34A, and 34B (e.g., internal mechanical and motion components, such as axels for the mask reel) for illustrative purposes.

As depicted in FIGS. 33, 34A, and 34B, a first layer of an object 3764 was the first to be exposed, as shown by print bed 3705d having the lowest position relative to the other beds and subsequently being further along in the print process. A first layer pattern mask that was positioned above print bed 3705*d* can then be rolled such that it aligns with the next print bed 3705*c*, and can be used to cure a first layer of the object 3762. In some embodiments, prior to advancing the mask reel 3730 such that the mask aligns with the print bed 3705*c*, the print bed 3705*d* can raise to separate the printed layer of the object 3764 from a base of the vessel 3703*d*. Alternatively, in some embodiments, the print bed 3705*d* can raise to separate the printed layer of the object 3764 while the mask reel 3730 is being rotated and/or while a layer of the object 3762 is being cured in the vessel 3703*c*.

Once the cure cycle is complete (and optionally the release cycle is complete) with respect to object 3762, the mask reel 3730 can be rotated once again to move the first layer pattern mask to be aligned with print bed 3705*b*, and curing and releasing can be performed with respect to object 3760. The mask reel 3730 can then be advanced to be used with vessel 3703*a* and print bed 3705*a*. This process can continue until the desired object is built up on each of the print beds 3705*a*, 3705*b*, 3705*c*, 3705*d*. This layout enables prints to occur in multiple vessels simultaneously once a mask has been aligned with each of them. As batch production is desirable at large scales, this configuration enables manufacturers of objects to employ a single mask reel in multiple 3D prints, and can avoid the cost of requiring digitally controlled light sources.

In alternative embodiments, the additive manufacturing devices can include a bottom-up light source design (e.g., with the light sources being disposed below the vessels, and light being shown upwards toward the vessels).

While four vessels 3703*a*, 3703*b*, 3703*c*, 3703*d* and associated components are depicted in FIGS. 33, 34A, and 34B, it can be appreciated that any number of vessels, light sources, print beds, etc. can be used, with a single mask reel being used to share masks between them.

Figure 29:
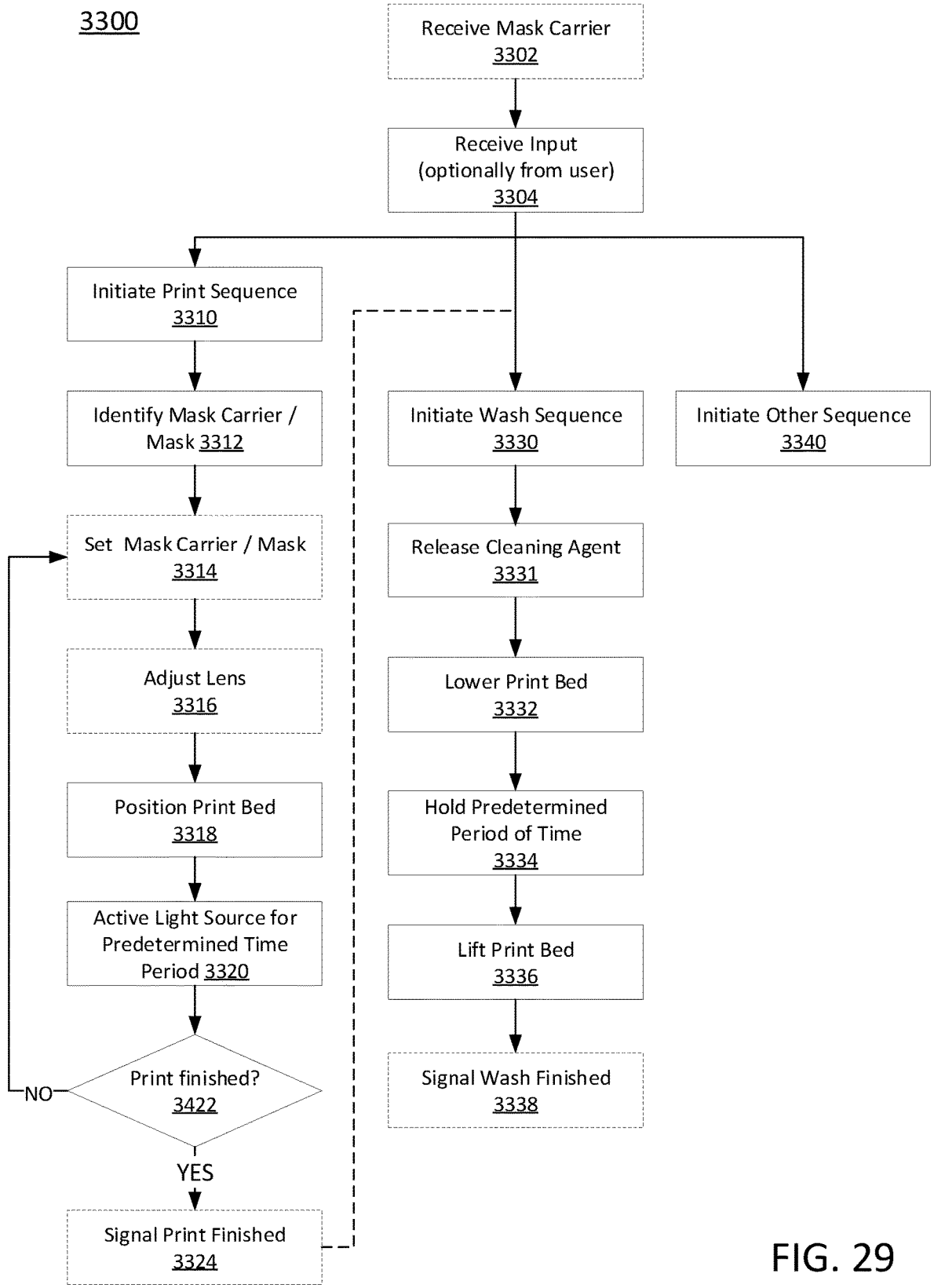
FIG. 29 is a flow diagram illustrating a method of operation of an additive manufacturing device, according to embodiments disclosed herein.
Figure 30A:
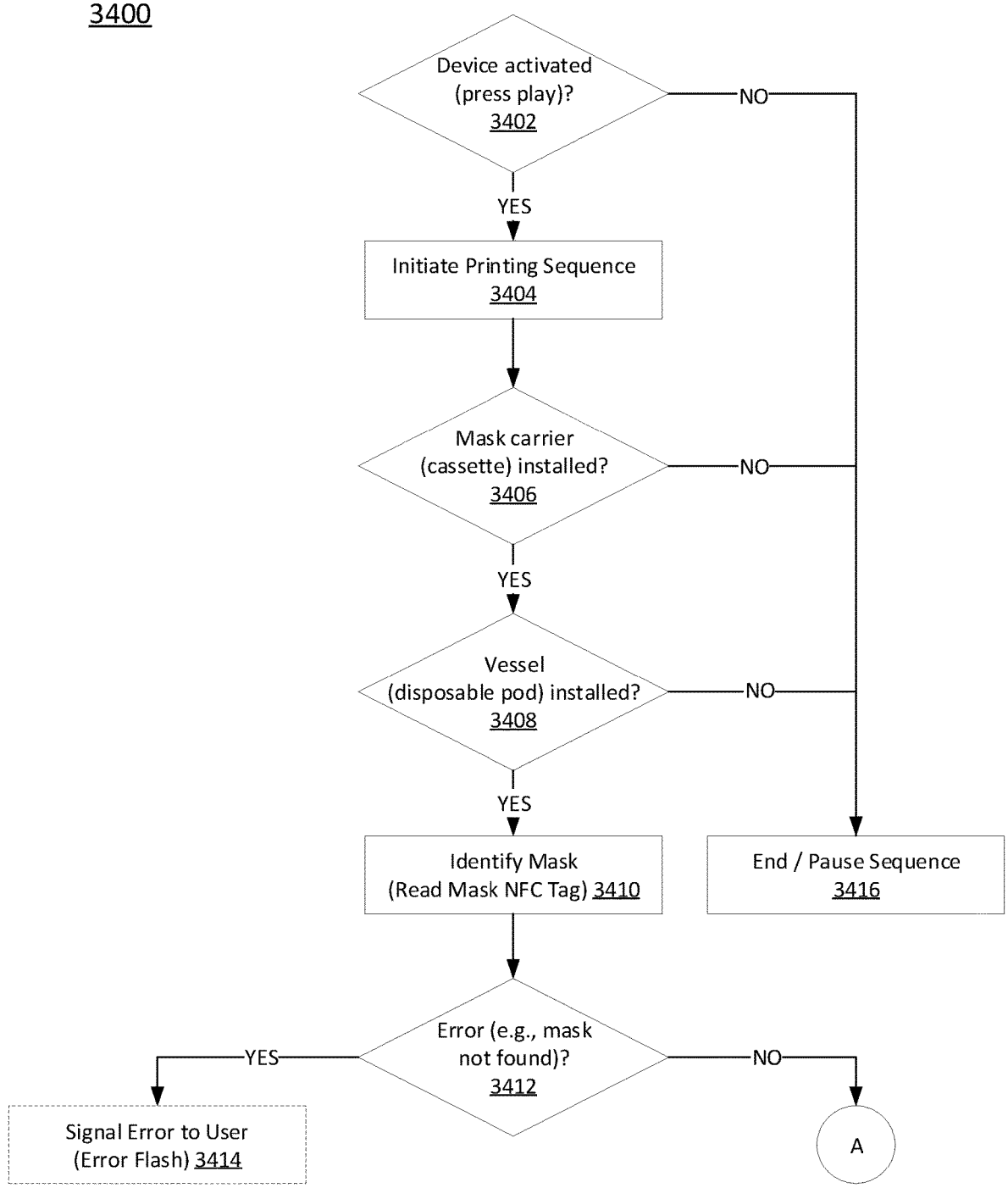
FIGS. 30A-C are flow diagrams illustrating a method of operation of an additive manufacturing device, according to embodiments disclosed herein.
Figure 30B:
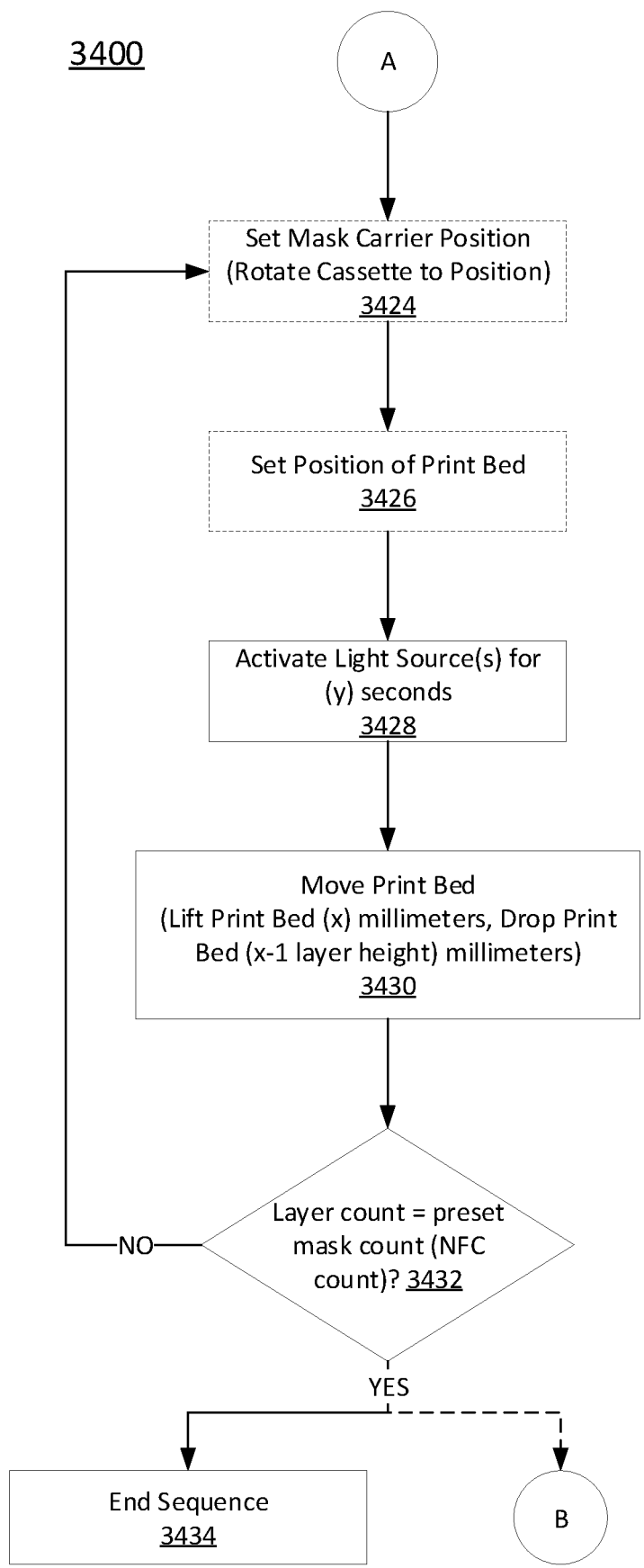
Figure 30C:
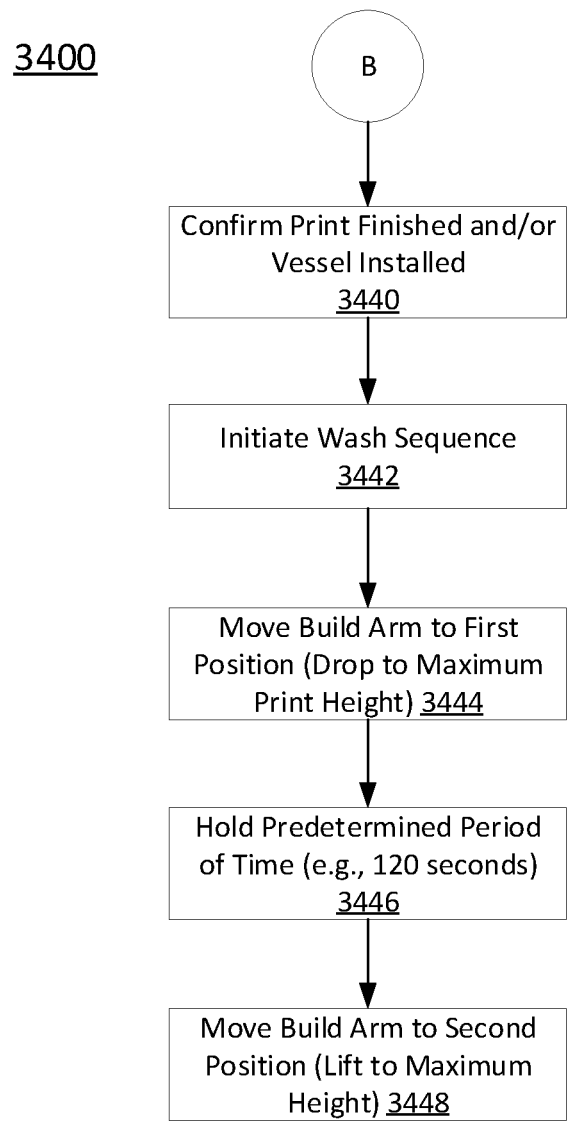

FIGS. 29-30C are flow diagrams illustrating methods that can be performed by an additive manufacturing device, such as any that are described herein. FIG. 29 depicts an example method 3300. The method 3300 can optionally include receiving a mask carrier, e.g., into an opening of an additive manufacturing device (e.g., opening 747 of additive manufacturing device 700), at 3302. For example, a user can install a mask carrier (e.g., containing a reel of masks or an individual mask) into the additive manufacturing device for use in printing a 3D object. In some embodiments, no mask carrier may be installed, e.g., because the mask carrier was pre-installed in the additive manufacturing device, or the user is using the additive manufacturing device without a mask carrier.

The additive manufacturing device can receive an input, e.g., from another device (e.g., an input device or compute device) and/or a user, at 3304. For example, the user can provide an input to the additive manufacturing device via a user interface (e.g., user interface 150). Based on the input provided, the additive manufacturing device may initiate a print sequence, at 3310, initiate a wash or clean sequence, at 3330, or initiate another sequence, at 3340. For example, if the input was a request to perform printing, then the additive manufacturing device may proceed to initiate a print sequence, at 3310. Alternatively, if the input was a request to perform cleaning, then the additive manufacturing device may proceed to initiate a wash sequence, at 3330.

With the print sequence, the additive manufacturing device can identify a mask carrier (e.g., mask carrier 130) or mask (e.g., mask 101) and/or obtain information associated with the mask carrier or mask, at 3312. Optionally, in some embodiments where a mask carrier may include a plurality of masks, the additive manufacturing device can, based on the identification and/or information obtained, position a particular mask between a light source and vessel for printing, at 3314. In other embodiments, e.g., where a mask carrier includes a single mask (e.g., such as with a SPMSD), no mask setting or positioning may be required. Optionally, the additive manufacturing device can control an image adjustment mechanism to optically change the images that are produced by the light source and mask, at 3316. The additive manufacturing device can then position a print bed (e.g., print bed 105) at a predefined layer height (e.g., one layer height) above a base (e.g., base 104) of a vessel (e.g., vessel 103) containing a liquid print material (e.g., photopolymer), at 3318. The additive manufacturing device can then activate a light source for a predetermined period of time to cure a layer of the print material, at 3320. The predetermined period of time, as described above, and be set based on an area of the print, a height of the layer, a type of photopolymer, a type of light source, etc. In some embodiments, the predetermined period of time can be provided in a tag (e.g., NFC tag) on the mask carrier, and the additive manufacturing device can read that information from the tag (e.g., using a NFC tag reader). In some embodiments, the predetermined period of time can be provided by a user, e.g., via an input device such as a user interface. In some embodiments, the predetermined period of time can be calculated or determined by a compute device (e.g., a controller 160) of the additive manufacturing device, e.g., using information collected by one or more sensors of the device (e.g., information regarding the mask or mask carrier, such as a size of the pattern, etc., that is read by a NFC reader and/or captured by an image capture device). After curing the first layer, the additive manufacturing device can optionally raise the print bed, if needed, to separate the print bed from a bottom surface of the vessel.

The additive manufacturing device can then determine whether the print is completed, at 3422. If the print is not completed (3422: NO), then the process can proceed back to determining whether a new mask needs to be exchanged for the current mask, at 3314, adjusting the image adjustment mechanism, at 3316, re-positioning the print bed, at 3318, and activating the light source, at 3320. Once the print is completed (3422: YES), then the additive manufacturing device can optionally signal that the print is finished to a user, e.g., using a user interface or connected device, at 3324.

Optionally, the additive manufacturing device can proceed from finishing the print to automatically initiating a wash sequence, at 3330. Alternatively, the additive manufacturing device can end operations. Also alternatively, the additive manufacturing device can prompt a user, e.g., via a user interface, to indicate whether the user wants to perform cleaning of the printed object.

With the wash sequence, the additive manufacturing device can release a cleaning agent and deliver it into the vessel where the printed object is, e.g., using a fluid transport mechanism 140, at 3331. As described above, the cleaning agent can be a fluid that is held in a different chamber from the liquid print material, and can be selectively released once the print is finished to clean the printed object. For example, the cleaning agent can be held in an inner lumen of a build arm (e.g., such as described with reference to build arm 806), which can be rotated to release the cleaning agent into the chamber with the printed object. The additive manufacturing device can then lower the print bed, at 3332, to submerge the printed object in the cleaning agent. The additive manufacturing device can hold the printed object for a predetermined period of time within the cleaning agent, at 3334, after which the additive manufacturing device can raise the print bed to remove the object from the cleaning agent, at 3336. Optionally, the additive manufacturing device can signal that the cleaning or wash is finished, e.g., using a user interface or connected device, at 3338.

FIGS. 30A-30C depict an example flow of the operation of a manufacturing device, according to embodiments described herein. In an embodiment, a user can connect the additive manufacturing device to a power source (e.g., plug in the device). Alternatively or additionally, the user can install a battery in the device and/or switch the device to a powered on state. The user can insert a vessel (e.g., vessel 103) and/or a mask carrier or mask (e.g., mask carrier 130 or mask 101) into respective orifices of the additive manufacturing device. Optionally, the user can select the object that the user wants to print, e.g., by using a scroll wheel or similar apparatus to advance the masks, or by providing an input to the device such that the device can rotate or wind a reel of masks to a position associated with the particular mask or object.

The user can instruct the device to perform a print operation (e.g., by pressing an input element such as a "play" button), which the additive manufacturing device can detect, at 3402. In response to the detecting, the additive manufacturing device can initiate a print sequence, at 3404. The additive manufacturing device can determine whether a mask carrier (e.g., cassette, reel, etc.) has been installed, at 3406. The additive manufacturing device can determine whether a vessel (e.g., disposable pod) has been installed, at 3408. If the mask carrier or vessel has not been installed, the additive manufacturing device can end or pause the printing, at 3416, or optionally send a message to the user, e.g., indicating that a component has not been installed. In some embodiments, where the user wants to proceed without a mask, the user can then provide an additional input to the additive manufacturing device to instruct the device to proceed.

After confirming that a mask carrier or mask has been installed, the additive manufacturing device can identify the mask or obtain information associated with the mask, e.g., by reading a tag (e.g., NFC tag) of the mask, at 3410. If the mask is not found (e.g., in a database of masks), or if reading the information indicates another error with the mask (3412: YES), the additive manufacturing device can optionally signal an error to the user, at 3414, and/or end or pause the sequence.

The method 3400 can then proceed to set the mask carrier or mask position, at 3424. For example, the additive manufacturing device can determine whether a particular mask has been aligned with a light source and vessel for printing. In some embodiments, the device can determine a position of a mask and/or whether a mask is aligned with a light source based on sensory components (e.g., sensory components 752, 754). Additionally or alternatively, the additive manufacturing device can determine which mask to place in position (e.g., by rotating one or more axels to advance the reel) based on information contained in a NFC tag or similar mechanism. Once the selected mask is in position, the device can lower a build arm and print bed into position, at 3426, such that a first layer of photopolymer (e.g., a one-layer height of photopolymer) can be exposed to light. The additive manufacturing device can then power on a light source (e.g., LEDs) for a predefined amount of time (y) (e.g., determined based on a NFC tag or similar mechanism), at 3428. Once exposed and the layer has hardened (e.g., cured), the device can lift the build arm a predefined distance (x) such that the cured photopolymer can peel from the base of the vessel (e.g., a membrane of the vessel), and then drop the printer build arm back to a position one-layer height higher than its previous position, at 3430.

The additive manufacturing device can then determine whether the print is finished, e.g., by determining whether its layer count is equal to the mask count contained in a NFC tag or similar mechanism, at 3432. If not finished (3432: NO), then the process can repeat. Optionally, at 3424, the device can rotate a reel inside the mask carrier to align a subsequent mask with the light source, and 3426-3230 can be repeated. In some embodiments, when the current mask does not need to be exchanged, the process can repeat by proceeding directly to exposing the photopolymer to light according to the same mask at one-layer height higher. This process can be repeated until an object is produced (3432: YES), and the sequence ends, at 3434, or proceeds onto a cleaning process, at 3440.

With cleaning, the additive manufacturing device can confirm that the print has finished and/or that a vessel with an object has been installed, at 3440. The additive manufacturing device can then initiate a wash sequence, at 3442, e.g., by release a cleaning agent. At 3444, the additive manufacturing device can move the build arm to a first position (e.g., a maximum print height) such that the object is submerged in the cleaning agent. The device can hold the print bed for a predetermined period of time (e.g., about 120 seconds or greater) at this position, at 3446. And at 3448, the additive manufacturing device can move the build arm to a second position (e.g., a maximum height) so that the object can be removed from the cleaning agent, at 3448.

Figure 31:
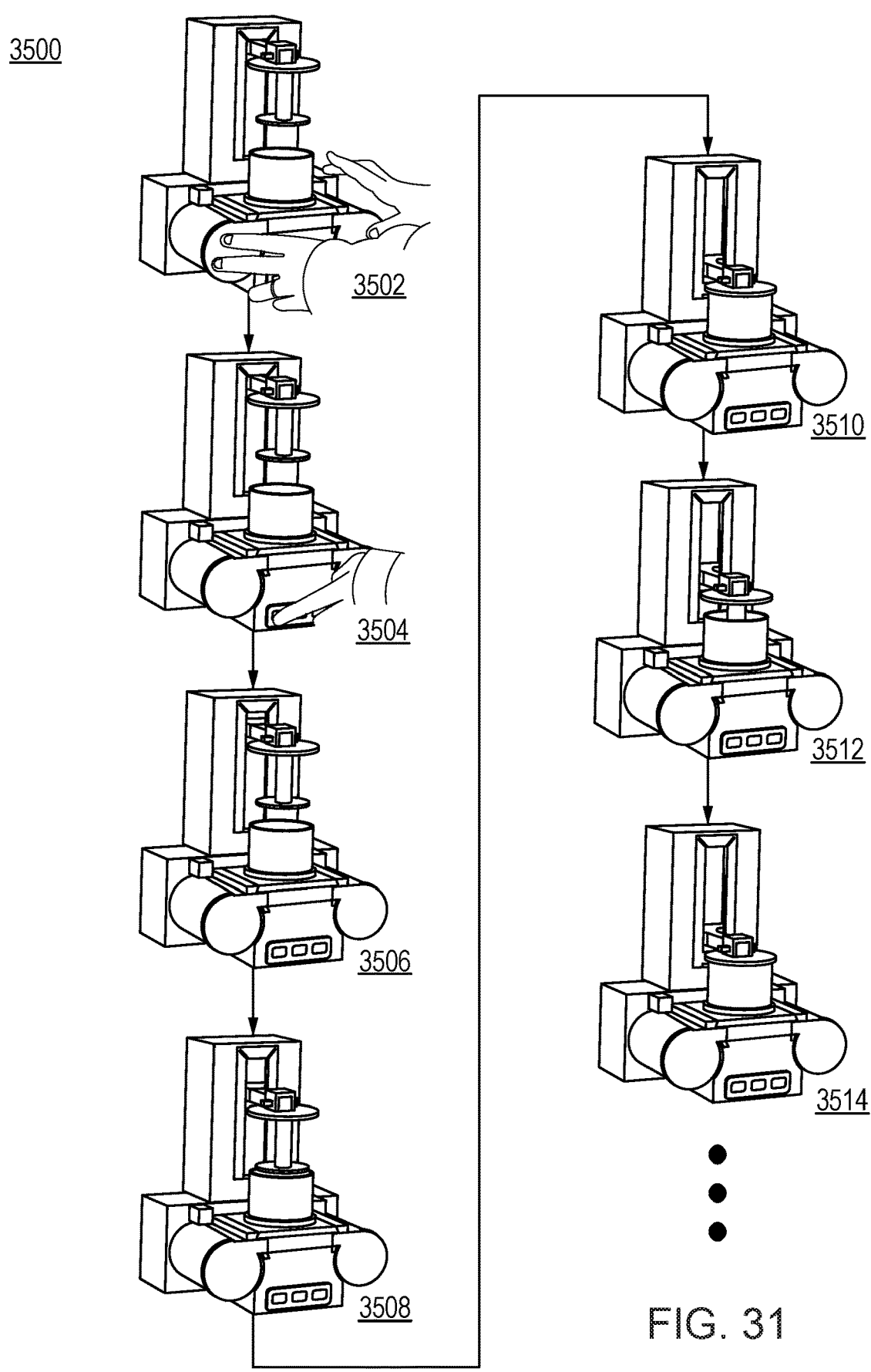
FIG. 31 are views of an additive manufacturing device during a print operation, according to embodiments disclosed herein.

FIG. 31 depicts example views of an additive manufacturing device in operation. At 3502, a user can install a mask carrier (e.g., a PMSD) into the device. The user can then press a button to initiate printing, at 3504. At 3506-3508, the device can perform its checking operations (e.g., checking for the presence of the vessel and/or mask carrier, and obtaining information regarding the print) and lower the build arm and print bed. Once in position, the device can active a light source to cure a layer of photopolymer, at 3510. The device can then lift the build arm, at 3512, to separate the cured photopolymer from the vessel bottom. And depending on a number of layers that still need to be cured, the device can re-position the print bed, at 3514, and repeat one or more steps to complete the print.

Figure 35:
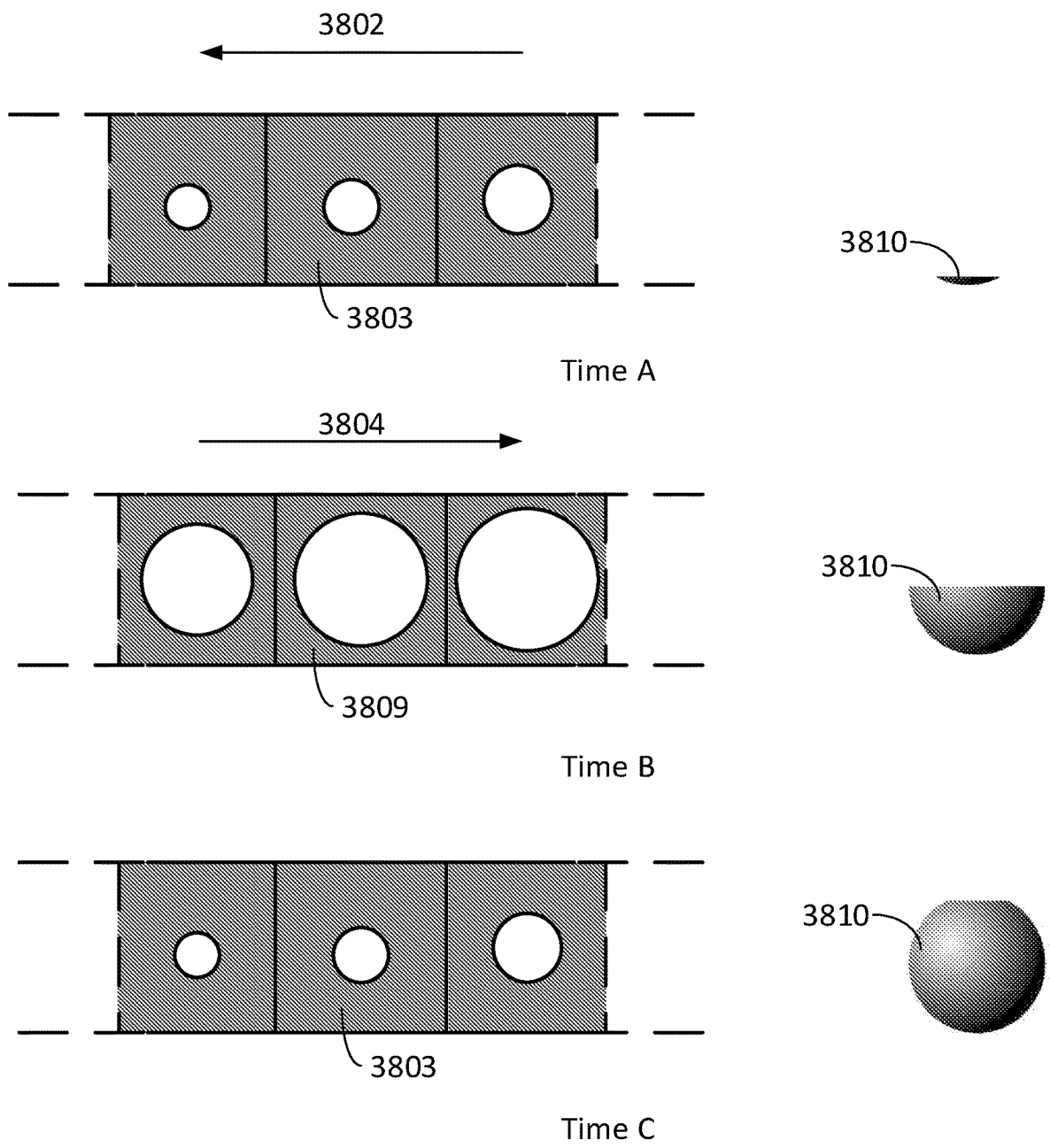
FIG. 35 depicts a flow of printing a 3D object using a set of masks, according to embodiments disclosed herein.

In some embodiments, objects including multiple layers with the same pattern can be printed by reusing one or more masks. For example, as depicted in FIG. 35, a sphere 3810 can be printed with masks totaling half a number of its layers, e.g., by rolling a mask reel in a first direction 3802 and then in a second direction 3804. As depicted, at a time A, a first mask 3803 can be used to print a layer of the sphere 3810. At time B, a second mask 3809 can be used to print a layer of the sphere 3810. This second mask can represent the point in the series of masks at which the rotation of the mask reel reverses, e.g., to go back along the earlier masks to print the second half of the sphere 3810. Accordingly, at a time C, the first mask 3803 can again be used to print a layer of the sphere 3810.

In some embodiments, a method or system can be provided for overlaying an augmented reality image onto a printed object. The method or system can be used with PMC devices or other types of printing devices. For example, the method or system can be incorporated into products or objects associated with a printing process (e.g., printing of inks and/or images), and manufactured using any method of mechanisms. The method or system can include a predefined or known geometry (e.g., a reference) and an augmented reality component provided via a compute device, such as a smartphone or other mobile device.

Augmented reality and/or image recognition software can be used to display and/or animate a printing of an object, e.g., using a mobile application and a phone screen. For example, a user can use a phone or other compute device with a display to watch an object be printed, coloured, animated, or otherwise enhanced or modified in their hand. The method or system involves being able to identify the object and locate the object in a surrounding environment (e.g., a print bed), e.g., via tags or other features incorporated into the object. For example, reference points can be manufactured into a printed object or an object's geometry can be known (e.g., predefined) and used as a reference prior to implementing the augmented reality overlay. A processor executing a software program can recognise the reference points or receive the reference of the object's geometry, and overlay a specific augmentation onto the object via an augmented reality component.

While various embodiments have been described and illustrated herein, it is to be understood that a variety of other components and/or means and/or structures for performing the function and/or obtaining the results and/or one or more of the advantages described herein, and each of such variations and/or modifications is deemed to be within the scope of the embodiments described herein. More generally, it is to be understood that all parameters, dimensions, materials, and configurations described herein are meant to be exemplary and that the actual parameters, dimensions, materials, and/or configurations will depend upon the specific application or applications for which the disclosed teachings is/are used. Those skilled in the art will recognize, or be able to ascertain using no more than routine experimentation, many equivalents to the specific disclosed embodiments described herein. It is, therefore, to be understood that the foregoing embodiments are presented by way of example only and that, within the scope of the embodiments, appended claims and equivalents thereto; embodiments can be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Various methods and/or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers/compute device and/or other processors to implement various aspects of the present disclosure as discussed above.

The terms "program" or "software" are used herein in a general sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure can be distributed in a modular fashion amongst a number of different compute devices/processors to implement various aspects of the disclosure.

Processor-executable instructions can be in many forms, such as program modules, executed by one or more compute devices, and can include routines, programs, objects, components, data structures, etc. that perform particular tasks or implement particular data types, and the functionality can be combined and/or distributed as appropriate for various embodiments.

Data structures can be stored in processor-readable media in a number of suitable forms. For simplicity of illustration, data structures may be shown to have fields that are related through location in the data structure. Such relationships can likewise be achieved by assigning storage for the fields with locations in a processor-readable medium that conveys relationship(s) between the fields. However, any suitable mechanism/tool can be used to establish a relationship between information in fields of a data structure, including through the use of pointers, tags or other mechanisms/tools that establish relationship between data elements.

Also, various concepts can be embodied as one or more methods, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

As used herein, the terms "about" and/or "approximately" when used in conjunction with numerical values and/or ranges generally refer to those numerical values and/or ranges near to a recited numerical value and/or range. In some instances, the terms "about" and "approximately" may mean within ±10% of the recited value. For example, in some instances, "about 100 [units]" may mean within ±10% of 100 (e.g., from 90 to 110). The terms "about" and "approximately" may be used interchangeably.

All definitions, as defined and used herein, should be understood to control over dictionary definitions, definitions in documents incorporated by reference, and/or ordinary meanings of the defined terms.

The use of flow diagrams is not meant to be limiting with respect to the order of operations performed. The herein described subject matter sometimes illustrates different components contained within, or connected with, different other components. It is to be understood that such depicted architectures are illustrative examples, and that in fact many other architectures can be implemented in accordance with the teachings herein to achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

The indefinite articles "a" and "an," as used herein, unless clearly indicated to the contrary, should be understood to mean "at least one."

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
   a light source configured to emit light;
   a vessel including:
      a chamber configured to contain a volume of print material; and
      a transparent base through which light can be received into the chamber to cure a portion of the volume of print material; and
   a set of masks defining a series of patterns associated with layers of a three-dimensional (3D) object, the set of masks positionable between the light source and the transparent base to control a pattern of the light that is received through the transparent base and into the chamber, wherein each of the masks includes a paper or polymer substrate with carbon-based ink portions and non-ink portions, the ink portions defining the series of patterns and blocking a portion of the light from the light source from passing therethrough.

2. The apparatus of claim 1, wherein the light emitted by the light source is UV light, and each of the ink portions block transmission of a portion of the UV light.

3. The apparatus of claim 1, wherein the print material is a photopolymer configured to change to a solid when exposed to the light received into the chamber.

4. The apparatus of claim 1, further comprising a mask carrier configured to store the set of masks,
   the mask carrier including a window configured to expose individual masks from the set of masks and positionable between the light source and the transparent base,
   the mask carrier configured to position the individual masks in the window according to a predefined sequence.

5. The apparatus of claim 4, wherein the mask carrier includes a near field communication (NFC) tag including information associated with the set of masks, the apparatus further including a NFC tag reader configured to read the NFC tag to retrieve the information.

6. The apparatus of claim 1, further comprising:
   a print bed coupled to a build arm, the print bed disposable within the chamber and configured to extend parallel to the transparent base of the vessel, the build arm configured to position the print bed at a plurality of positions relative to the transparent base of the vessel such that a portion of the volume of print material can be cured at each of the plurality of positions to form each layer of the 3D object.

7. The apparatus of claim 6, wherein each layer of the 3D object is formed on the transparent base, the build arm configured to move the print bed in a direction orthogonal to the transparent base to release each layer of the 3D object from the transparent base after that layer has been formed.

8. The apparatus of claim 1, wherein the vessel is a sealed vessel having a top opening through which the build arm extends.

9. The apparatus of claim 1, wherein the vessel includes a rigid body defining a bottom opening, the transparent base being a membrane stretched tautly across the opening of the rigid body.

10. The apparatus of claim 9, wherein the membrane is formed of at least one of: fluorinated ethylene propylene (FEP) or polypropylene (PP).

11. The apparatus of claim 1, wherein the vessel further includes a reservoir configured to hold a volume of cleaning fluid separate from the volume of print material, the reservoir being selectively coupleable to the chamber to release the volume of cleaning fluid into the chamber.

12. The apparatus of claim 1, further comprising an image adjustment mechanism configured to optically modify the pattern of the light.

13. The apparatus of 17, wherein the image adjustment mechanism includes:
  a lens positionable between individual masks from the set of masks and the transparent base; and
  a lens mount configured to move the lens relative to the individual masks to optically modify the pattern of light.

14. An apparatus, comprising:
  a light source configured to emit light;
    a vessel including:
      a chamber configured to contain a volume of print material; and
      a transparent base through which light can be received into the chamber to cure a portion of the volume of print material;
      a set of masks substrate with carbon-based ink portions and non-ink portions, the ink portions defining a series of patterns associated with layers of a three-dimensional (3D) object, the set of masks positionable between the light source and the transparent base to control a pattern of the light that is received through the transparent base and into the chamber; and
      wherein the light emitted by the light source is ultraviolet (UV) light, and the set of masks includes a substrate with etched areas that are transmissive to UV light and nonetched areas that block UV light.

15. An apparatus, comprising:
  a light source configured to emit light;
  a vessel including:
  a chamber configured to contain a volume of print material; and
    a transparent base through which light can be received into the chamber to cure a portion of the volume of print material;
      a set of masks defining a series of patterns associated with layers of a three-dimensional (3D) object, the set of masks positionable between the light source and the transparent base to control a pattern of the light that is received through the transparent base and into the chamber;
    wherein the vessel further includes a reservoir configured to hold a volume of cleaning fluid separate from the volume of print material, the reservoir being selectively coupleable to the chamber to release the volume of cleaning fluid into the chamber;
  a mask carrier configured to store the set of masks, the mask carrier including a window configured to expose individual masks from the set of masks and positionable between the light source and the transparent base,
  the mask carrier configured to position the individual masks in the window according to a predefined sequence;
    wherein the mask carrier includes a near field communication (NFC) tag including information associated with the set of masks, the apparatus further including a NFC tag reader configured to read the NFC tag to retrieve the information; and
    wherein the information associated with the set of masks includes at least one of: a number of masks in the set of masks, a height of each layer of the 3D object, a light exposure time required to form each layer of the 3D object, a distance between adjacent masks from the set of masks, or a size of each of the set of masks.

16. An apparatus comprising:
a light source configured to emit light;
a vessel including:
  a chamber configured to contain a volume of print material; and
  a transparent base through which light can be received into the chamber to cure a portion of the volume of print material;
a set of masks defining a series of patterns associated with layers of a three-dimensional (3D) object, the set of masks positionable between the light source and the transparent base to control a pattern of the light that is received through the transparent base and into the chamber, wherein each of the masks includes a paper or polymer substrate with ink portions and non-ink portions, the ink portions defining the series of patterns and blocking a portion of the light from the light source from passing therethrough;
a mask carrier configured to store the set of masks, the mask carrier including a window configured to expose individual masks from the set of masks and positionable between the light source and the transparent base, the mask carrier configured to position the individual masks in the window according to a predefined sequence; and
a support structure including:
  a slot configured to receive a portion of the mask carrier; and
  a coupling mechanism configured to receive a portion of the vessel and defining an opening configured to align with the transparent base of the vessel, the coupling mechanism disposed above the slot such that the opening and the transparent base can be disposed above and in alignment with the individual masks.

17. An apparatus, comprising:
a light source configured to emit light;
a vessel including:
a chamber configured to contain a volume of print material; and
a transparent base through which light can be received into the chamber to cure a portion of the volume of print material;
a set of masks defining a series of patterns associated with layers of a three-dimensional (3D) object, the set of masks positionable between the light source and the transparent base to control a pattern of the light that is received through the transparent base and into the chamber;

wherein the vessel further includes a reservoir configured to hold a volume of cleaning fluid separate from the volume of print material, the reservoir being selectively coupleable to the chamber to release the volume of cleaning fluid into the chamber; and wherein the vessel includes a build arm including an inner lumen that functions as the reservoir, the build arm rotatable to selectively couple the reservoir to the chamber such that the volume of cleaning fluid can be released into the chamber.

\* \* \* \* \*